United States Patent
Tsai et al.

(10) Patent No.: US 8,670,189 B2
(45) Date of Patent: Mar. 11, 2014

(54) OPTICAL IMAGE CAPTURING ASSEMBLY

(75) Inventors: Tsung-Han Tsai, Taichung (TW); Ming-Ta Chou, Taichung (TW)

(73) Assignee: Largan Precision Co., Ltd., Taichung (TW)

(*) Notice: Subject to any disclaimer, the term of this patent is extended or adjusted under 35 U.S.C. 154(b) by 203 days.

(21) Appl. No.: 13/335,951

(22) Filed: Dec. 23, 2011

(65) Prior Publication Data
US 2012/0327522 A1    Dec. 27, 2012

(30) Foreign Application Priority Data
Jun. 27, 2011 (TW) .............................. 100122470 A

(51) Int. Cl.
G02B 3/02    (2006.01)

(52) U.S. Cl.
USPC ......................................................... 359/715

(58) Field of Classification Search
USPC .......................................... 359/642, 708, 715
See application file for complete search history.

(56) References Cited

U.S. PATENT DOCUMENTS

| | | | |
|---|---|---|---|
| 7,085,077 B1 | 8/2006 | Noda | |
| 7,365,920 B2 | 4/2008 | Noda | |
| 7,532,415 B2 | 5/2009 | Sato | |
| 7,660,049 B2 | 2/2010 | Tang | |
| 7,692,877 B2 | 4/2010 | Tang et al. | |
| 7,869,142 B2* | 1/2011 | Chen et al. | 359/775 |
| 2010/0149659 A1* | 6/2010 | Chen et al. | 359/715 |
| 2010/0284094 A1* | 11/2010 | Chen et al. | 359/775 |

FOREIGN PATENT DOCUMENTS

| | | |
|---|---|---|
| TW | M368075 | 11/2009 |
| TW | M390465 | 10/2010 |

* cited by examiner

*Primary Examiner* — James Greece
(74) *Attorney, Agent, or Firm* — CKC & Partners Co., Ltd.

(57) ABSTRACT

An optical image capturing assembly includes, in order from an object side to an image side, a first lens element, a second lens element, a third lens element and a fourth lens element. The first lens element with positive refractive power has a convex object-side surface. The second lens element with negative refractive power has a concave object-side surface and a convex image-side surface. The third lens element with positive refractive power is made of plastic material, and has a convex object-side surface and a convex image-side surface. The fourth lens element with negative refractive power is made of plastic material, and has a convex object-side surface and a concave image-side surface. The object-side surfaces and the image-side surfaces of the third lens element and the fourth lens element are aspheric. The fourth lens element has at least one inflection point formed on at least one surface thereof.

14 Claims, 16 Drawing Sheets

OPTICAL IMAGE CAPTURING ASSEMBLY

RELATED APPLICATIONS

The application claims priority to Taiwan Application Serial Number 100122470, filed Jun. 27, 2011, which is herein incorporated by reference.

BACKGROUND

1. Technical Field

The present disclosure relates to an optical image capturing assembly. More particularly, the present disclosure relates to a compact optical image capturing assembly applicable to electronic products.

2. Description of Related Art

In recent years, with the popularity of mobile products with camera functionalities, the demand for miniaturizing an optical image capturing assembly is increasing. The sensor of a conventional photographing camera is typically a CCD (Charge Coupled Device) or a CMOS (Complementary Metal-Oxide Semiconductor Sensor). As advanced semiconductor manufacturing technologies have allowed the pixel size of sensors to be reduced and compact optical image lens assemblies have gradually evolved toward the fields of higher megapixels, there is an increasing demand for optical image capturing assemblies featuring better image quality.

A conventional optical image capturing assembly in a portable electronic product typically utilizes a three-element lens structure. Such a conventional optical image capturing assembly has a first lens element with positive refractive power, a second lens element with negative refractive power and a third lens element with positive refractive power. The first, second and third lens elements are arranged in this order from an object-side to an image-side. Although the three-element lens structure is compact, it is not able to produce high quality images.

Further, another conventional compact optical image capturing assembly provides a four-element lens structure. The first lens element and the second lens element of the four-element lens structure are two glass spherical lens elements which are attached to each other to form a doublet lens for eliminating chromatic aberration. However, this lens structure requires a longer total optical track length caused by insufficient degrees of freedom in setting system parameters due to too many spherical lenses allocated. Moreover, it is not easy to attach the glass lenses, and thus the manufacturing process for forming the glass doublet lenses is difficult. Therefore, a need exists in the art for providing an optical image capturing assembly for use in a mobile electronic product that has excellent imaging quality without too long total track length.

SUMMARY

According to one aspect of the present disclosure, an optical image capturing assembly includes, in order from an object side to an image side, a first lens element, a second lens element, a third lens element and a fourth lens element. The first lens element with positive refractive power has a convex object-side surface. The second lens element with negative refractive power has a concave object-side surface and a convex image-side surface. The third lens element with positive refractive power is made of plastic material, and has a convex object-side surface and a convex image-side surface, wherein the object-side surface and the image-side surface of the third lens element are aspheric. The fourth lens element with negative refractive power is made of plastic material, and has a convex object-side surface and a concave image-side surface, wherein the object-side surface and the image-side surface of the fourth lens element are aspheric, and the fourth lens element has at least one inflection point formed on at least one of the object-side surface and the image-side surface thereof. When a focal length of the optical image capturing assembly is f, a focal length of the fourth lens element is f4, a curvature radius of the image-side surface of the second lens element is R4, and the following relationships are satisfied:

$$-2.5 < f/f4 < -0.6;\text{ and}$$

$$-5.0 < R4/f < -0.2.$$

DETAILED DESCRIPTION

Figure 1:
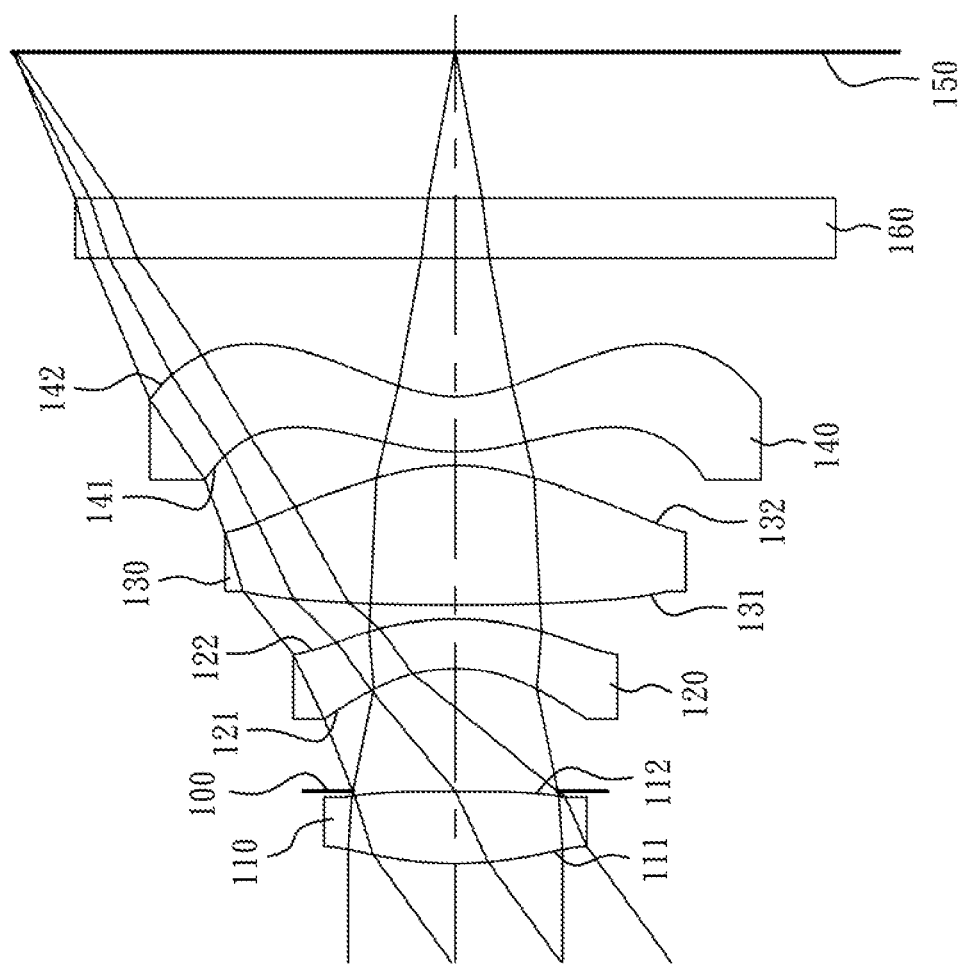
FIG. 1 is a schematic view of an optical image capturing assembly according to the first embodiment of the present disclosure.

An optical image capturing assembly includes, in order from an object side to an image side, a first lens element, a second lens element, a third lens element and a fourth lens element. The optical image capturing assembly further includes an image sensor located on an image plane.

The first lens element with positive refractive power provides partial refractive power for reducing the total track length and adjusting the photosensitivity of the optical image capturing assembly. The first lens element can have a convex object-side surface and a concave image-side surface, or a convex object-side surface and a convex image-side surface. When the first lens element has a convex object-side surface and a concave image-side surface, the spherical aberration of the optical image capturing assembly can be corrected. When the first lens element has a convex object-side surface and a convex image-side surface, the refractive power of the first lens element can be enhanced for reducing the total track length of the optical image capturing assembly.

The second lens element with negative refractive power can correct the aberration generated from the first lens element with positive refractive power and the chromatic aberration of the optical image capturing assembly. The second lens element has a concave object-side surface and a convex image-side surface, so that the astigmatism of the optical image capturing assembly can be corrected for enhancing image quality.

The third lens element with positive refractive power provides main refractive power for reducing the total track length of the optical image capturing assembly. The third lens element has a convex object-side surface and a convex image-side surface for enhancing the positive refractive power of the third lens element, so that the total track length of the optical image capturing assembly can be further reduced.

The fourth lens element has negative refractive power, so that the principal point of the optical image capturing assembly can be positioned away from the image plane, and the total track length of the optical image capturing assembly can be reduced so as to maintain the compact size of the optical image capturing assembly. The fourth lens element has a convex object-side surface and a concave image-side surface, so that the astigmatism and the high order aberration of the optical image capturing assembly can be corrected.

When a focal length of the optical image capturing assembly is f, and a focal length of the fourth lens element is f4, the following relationship is satisfied:

$-2.5 < f/f4 < -0.6.$

Therefore, the refractive power of the fourth lens element can be controlled, and the position of the principal point of the optical image capturing assembly can be adjusted, so that the total track length of the optical image capturing assembly can be reduced.

When the focal length of the optical image capturing assembly is f, and a curvature radius of the image-side surface of the second lens element is R4, the following relationship is satisfied:

$-5.0 < R4/f < -0.2.$

Therefore, the curvature of the image-side surface of the second lens element can correct the aberration of the optical image capturing assembly effectively.

R4 and f can further satisfy the following relationship:

$-1.8 < R4/f < -0.2.$

When a curvature radius of the object-side surface of the fourth lens element is R7, and a curvature radius of the image-side surface of the fourth lens element is R8, the following relationship is satisfied:

$1.0 < (R7+R8)/(R7-R8) < 6.0.$

Therefore, the principal point of the optical image capturing assembly can be further positioned away from the image plane, and the total track length of the optical image capturing assembly can be further reduced.

When a curvature radius of the object-side surface of the first lens element is R1, and a curvature radius of the image-side surface of the first lens element is R2, the following relationship is satisfied:

$-2.0 < (R1+R2)/(R1-R2) < 0.0.$

Therefore, the spherical aberration of the optical image capturing assembly can be further corrected.

When the Abbe number of the first lens element is V1, and the Abbe number of the second lens element is V2, the following relationship is satisfied:

$28 < V1-V2 < 42.$

Therefore, the chromatic dispersion of the optical image capturing assembly can be corrected.

When an axial distance between the first lens element and the second lens element is T12, and the focal length of the optical image capturing assembly is f, the following relationship is satisfied:

$0.13 < T12/f < 0.27.$

Therefore, the distance between the first lens element and the second lens element will not be too long or too short, so that the foregoing relationships is advantageous to the fabrication of the lens elements, and the distribution of the space of the optical image capturing assembly so as to maintain the compact size of the optical image capturing assembly.

When the focal length of the optical image capturing assembly is f, and a focal length of the second lens element is f2, the following relationship is satisfied:

$-1.4 < f/f2 < -0.6.$

Therefore, the refractive power of the second lens element can correct the aberration generated from the first lens element.

When a central thickness of the first lens element is CT1, and the axial distance between the first lens element and the second lens element is T12, the following relationship is satisfied:

$0.2 < CT1/T12 < 1.3.$

Therefore, the relationship between the thickness of the first lens element and the distance between the first lens element and the second lens element is proper for distributing the refractive power of the optical image capturing assembly effectively, and reducing the sensitivity of the power distribution thereof.

When a sum of the central thickness from the first lens element to the fourth lens element is $\Sigma CT$, and an axial distance between the object-side surface of the first lens element and the image-side surface of the fourth lens element is Td, the following relationship is satisfied:

$0.5 < \Sigma CT/Td < 0.81.$

Therefore, the total track length of the optical image capturing assembly can be reduced while retaining the high image quality so as to employ in the compact size electric product.

When a maximal field of view of the optical image capturing assembly is FOV, the following relationship is satisfied:

$72 \text{ degrees} \leq FOV < 100 \text{ degrees}.$

Therefore, the proper field of view can be provided for capturing images with higher image quality.

When the focal length of the optical image capturing assembly is f, and a focal length of the third lens element is f3, the following relationship is satisfied:

1.2<f/f3<1.83.

Therefore, the refractive power of the third lens element can further reduce the total track length of the optical image capturing assembly.

When a maximum image height of the optical image capturing assembly is ImgH, which is a half of the diagonal length of the effective photosensitive area of the image sensor (not shown in drawing), and an axial distance between the object-side surface of the first lens element and the image plane is TTL, the following relationship is satisfied:

TTL/ImgH<1.95.

Therefore, the total track length of the optical image capturing assembly can be reduced in order to maintain the compact size of the optical image capturing assembly. As a result, the optical image capturing assembly may be employed in lightweight and portable electronic products.

According to the optical image capturing assembly of the present disclosure, the lens elements thereof can be made of plastic material or glass. When the lens elements are made of plastic material, the cost of manufacture can be effectively reduced. When the lens elements are made of glass material, the range of the refractive power of the optical image capturing assembly can be set may be increased. Furthermore, the surface of each lens element can be aspheric, so that it is easier to make the surface into non-spherical shapes. As a result, more controllable variables are obtained, and the aberration is reduced, and the number of required lens elements can be reduced while constructing an optical system. Therefore, the total track length of the optical image lens assembly can also be reduced.

According to the optical image capturing assembly of the present disclosure, the lens elements can have inflection points formed on the surfaces thereof. Therefore, the incident angle of the off-axis field of light on the image sensor can be effectively minimized and the aberration of the off-axis field can be corrected.

According to the optical image capturing assembly of the present disclosure, when the lens element has a convex surface, it indicates that the paraxial region of the surface is convex; and when the lens element has a concave surface, it indicates that the paraxial region of the surface is concave.

According to the optical image capturing assembly of the present disclosure, the optical image capturing assembly can include at least one stop, may it be glare stop or field stop, for reducing stray light while retaining high image quality. Furthermore, when the stop is an aperture stop, the position of the aperture stop within an optical system can be arbitrarily placed in front of the entire optical system, within the optical system, or in front of the image plane in accordance with the preference of the designer of the optical system, in order to achieve the desirable optical features or higher image quality produced from the optical system.

According to the above description of the present disclosure, the following 1st-8th specific embodiments are provided for further explanation.

Figure 2:
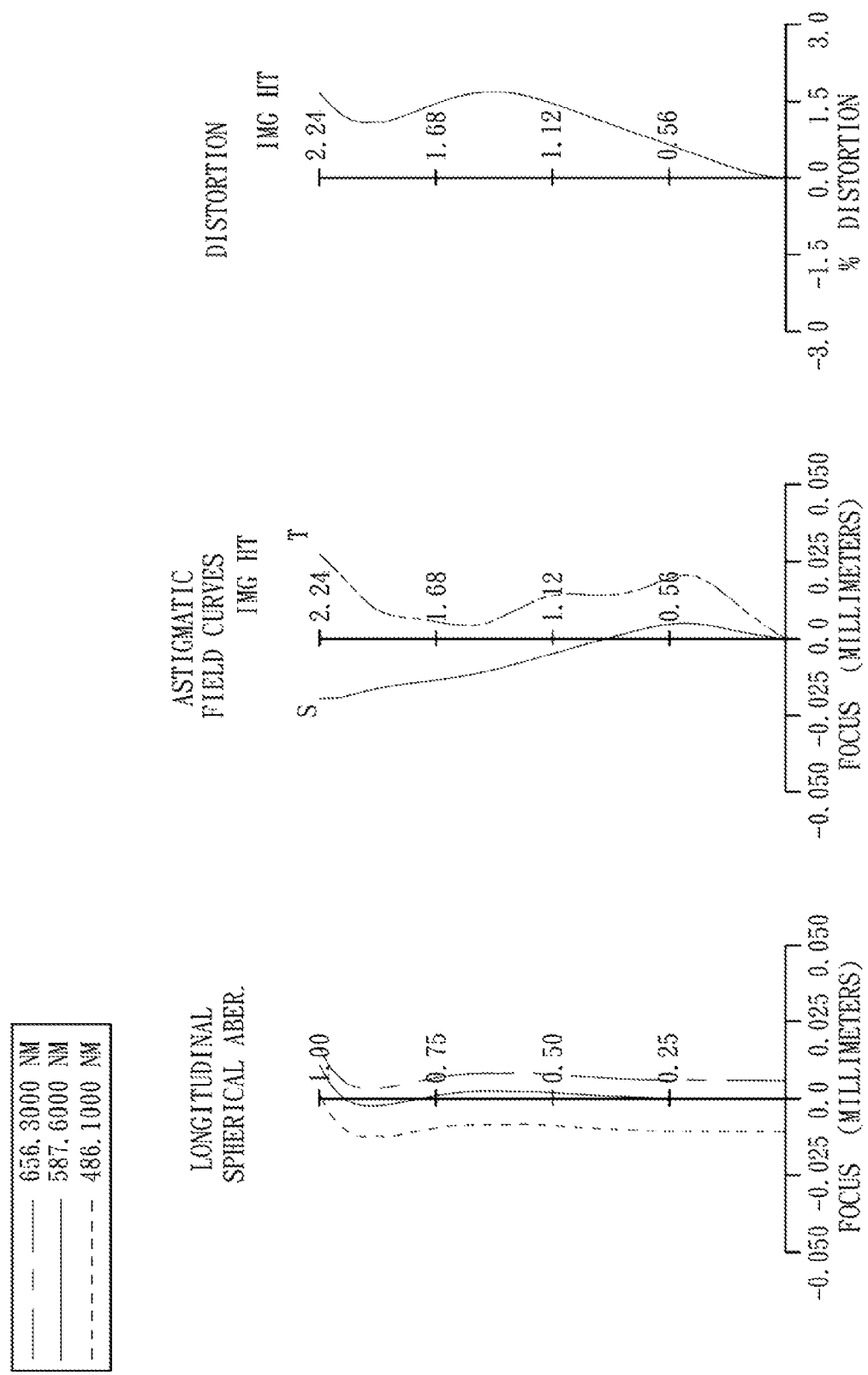
FIG. 2 shows spherical aberration curves, astigmatic field curves and a distortion curve of the optical image capturing assembly according to the first embodiment.

FIG. 1 is a schematic view of an optical image capturing assembly according to the first embodiment of the present disclosure. FIG. 2 shows spherical aberration curves, astigmatic field curves and a distortion curve of the optical image capturing assembly according to the first embodiment. In FIG. 1, the optical image capturing assembly includes, in order from an object side to an image side, the first lens element 110, an aperture stop 100, the second lens element 120, the third lens element 130, the fourth lens element 140, an IR (infrared) cut filter 160 and an image plane 150.

The first lens element 110 is made of plastic material. The first lens element 110 with positive refractive power has a convex object-side surface 111 and a convex image-side surface 112. The object-side surface 111 and the image-side surface 112 of the first lens element 110 are aspheric.

The second lens element 120 is made of plastic material. The second lens element 120 with negative refractive power has a concave object-side surface 121 and a convex image-side surface 122. The object-side surface 121 and the image-side surface 122 of the second lens element 120 are aspheric.

The third lens element 130 is made of plastic material. The third lens element 130 with positive refractive power has a convex object-side surface 131 and a convex image-side surface 132. The object-side surface 131 and the image-side surface 132 of the third lens element 130 are aspheric.

The fourth lens element 140 is made of plastic material. The fourth lens element 140 with negative refractive power has a convex object-side surface 141 and a concave image-side surface 142. The object-side surface 141 and the image-side surface 142 of the fourth lens element 140 are aspheric. Furthermore, the fourth lens element 140 has inflection points formed on the object-side surface 141 and the image-side surface 142 thereof.

The IR cut filter 160 is made of glass and located between the fourth lens element 140 and the image plane 150, and will not affect the focal length of the optical image capturing assembly.

The equation of the aspheric surface profiles of the aforementioned lens elements of the first embodiment is expressed as follows:

$$X(Y) = (Y^2/R)/(1 + sqrt(1 - (1+k) \times (Y/R)^2)) + \sum_i (Ai) \times (Y^i)$$

where:

X is the height of a point on the aspheric surface spaced at a distance Y from the optical axis relative to the tangential plane at the aspheric surface vertex;

Y is the distance from the point on the curve of the aspheric surface to the optical axis;

R is the curvature radius of the lens elements;

k is the conic coefficient; and

Ai is the i-th aspheric coefficient.

In the optical image capturing assembly according to the first embodiment, when a focal length of the optical image capturing assembly is f, an f-number of the optical image capturing assembly is Fno, a half of the maximal field of view is HFOV, and a maximal field of view of the optical image capturing assembly is FOV, these parameters have the following values:

f=3.03 mm;
Fno=2.80;
HFOV=36.0 degrees; and
FOV=72.0 degrees.

In the optical image capturing assembly according to the first embodiment, when the Abbe number of the first lens element 110 is V1, and the Abbe number of the second lens element 120 is V2, the following relationship is satisfied:

V1−V2=32.1.

In the optical image capturing assembly according to the first embodiment, when the focal length of the optical image capturing assembly is f, an axial distance between the first lens element 110 and the second lens element 120 is T12, and a central thickness of the first lens element 110 is CT1, the following relationships are satisfied:

$T12/f=0.20$; and $CT1/T12=0.59$.

In the optical image capturing assembly according to the first embodiment, when a sum of the central thickness from the first lens element 110 to the fourth lens element 140 is ΣCT, and an axial distance between the object-side surface 111 of the first lens element 110 and the image-side surface 142 of the fourth lens element 140 is Td, the following relationship is satisfied:

$\Sigma CT/Td=0.68$.

In the optical image capturing assembly according to the first embodiment, when a curvature radius of the image-side surface 122 of the second lens element 120 is R4, and the focal length of the optical image capturing assembly is f, the following relationship is satisfied:

$R4/f=-0.55$.

In the optical image capturing assembly according to the first embodiment, when a curvature radius of the object-side surface 111 of the first lens element 110 is R1, a curvature radius of the image-side surface 112 of the first lens element 110 is R2, a curvature radius of the object-side surface 141 of the fourth lens element 140 is R7, and a curvature radius of the image-side surface 142 of the fourth lens element 140 is R8, the following relationships are satisfied:

$(R1+R2)/(R1-R2)=-0.83$; and $(R7+R8)/(R7-R8)=3.53$.

In the optical image capturing assembly according to the first embodiment, the focal length of the optical image capturing assembly is f, a focal length of the second lens element 120 is f2, a focal length of the third lens element 130 is f3, a focal length of the fourth lens element 140, and the following relationships are satisfied:

$f/f2=-1.01$;

$f/f3=1.67$; and $f/f4=-0.91$.

In the optical image capturing assembly according to the first embodiment, when a maximum image height of the optical image capturing assembly is ImgH, and an axial distance between the object-side surface 111 of the first lens element 110 and the image plane 150 is TTL, the following relationship is satisfied:

$TTL/ImgH=1.79$.

The detailed optical data of the first embodiment are shown in Table 1 to and the aspheric surface data are shown in Table 2 below.

TABLE 1

| 1st Embodiment f = 3.03 mm, Fno = 2.80, HFOV = 36.0 deg. | | | | | | | |
|---|---|---|---|---|---|---|---|
| Surface # | | Curvature Radius | Thickness | Material | Index | Abbe # | Focal length |
| 0 | Object | Plano | Infinity | | | | |
| 1 | Lens 1 | 1.826030 (ASP) | 0.367 | Plastic | 1.544 | 55.9 | 3.08 |
| 2 | | −19.137400 (ASP) | 0.001 | | | | |
| 3 | Ape. Stop | Plano | 0.618 | | | | |
| 4 | Lens 2 | −0.838520 (ASP) | 0.250 | Plastic | 1.634 | 23.8 | −3.00 |
| 5 | | −1.675250 (ASP) | 0.070 | | | | |
| 6 | Lens 3 | 13.831300 (ASP) | 0.706 | Plastic | 1.544 | 55.9 | 1.82 |
| 7 | | −1.047340 (ASP) | 0.070 | | | | |
| 8 | Lens 4 | 1.154310 (ASP) | 0.280 | Plastic | 1.544 | 55.9 | −3.33 |
| 9 | | 0.644530 (ASP) | 0.700 | | | | |
| 10 | IR-filter | Plano | 0.300 | Glass | 1.516 | 64.1 | — |
| 11 | | Plano | 0.742 | | | | |
| 12 | Image | Plano | — | | | | |

Note:
Reference wavelength (d-line) is 587.6 nm.

TABLE 2

| Aspheric Coefficients | | | | |
|---|---|---|---|---|
| Surface # | 1 | 2 | 4 | 5 |
| k = | −2.18305E+00 | −1.00000E+00 | −1.13759E+00 | 4.94964E−01 |
| A4 = | −3.02068E−02 | −1.54181E−01 | −1.73285E−01 | −1.57300E−01 |
| A6 = | −1.34662E−01 | −1.35785E−01 | 1.33862E−01 | 3.84218E−01 |
| A8 = | −1.08308E−01 | −3.23707E−01 | 9.08255E−01 | 7.91611E−02 |
| A10 = | −3.67931E−01 | −1.60334E−01 | 1.01176E−01 | −1.36600E−01 |
| A12 = | −8.74688E−02 | 1.20473E+00 | −3.47783E+00 | −8.72088E−02 |
| A14 = | | | 2.59510E+00 | 1.57481E−01 |
| A16 = | | | 3.14651E+00 | 2.86741E−02 |
| Surface # | 6 | 7 | 8 | 9 |
| k = | −5.00000E+01 | −6.87621E+00 | −3.84277E+00 | −3.78969E+00 |
| A4 = | 2.04472E−02 | −6.20813E−03 | −2.53831E−01 | −1.90994E−01 |

TABLE 2-continued

Aspheric Coefficients

| A6 = | −1.26136E−02 | −1.60972E−02 | 3.44144E−02 | 5.53886E−02 |
|---|---|---|---|---|
| A8 = | 5.63510E−03 | −1.60143E−03 | 2.05944E−03 | −1.07855E−02 |
| A10 = | 4.57225E−03 | 5.66629E−03 | −7.11101E−03 | −2.25922E−03 |
| A12 = | 1.56416E−03 | 4.17549E−03 | −2.29459E−03 | 5.57507E−04 |
| A14 = | 8.15695E−04 | 1.49270E−03 | −8.48376E−04 | 1.87500E−04 |
| A16 = | −7.80344E−04 | −8.17716E−04 | 9.11767E−04 | −6.26653E−05 |

In Table 1, the curvature radius, the thickness and the focal length are shown in millimeters (mm). Surface numbers 0-12 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and thus an explanation in this regard will not be provided again.

Figure 3:
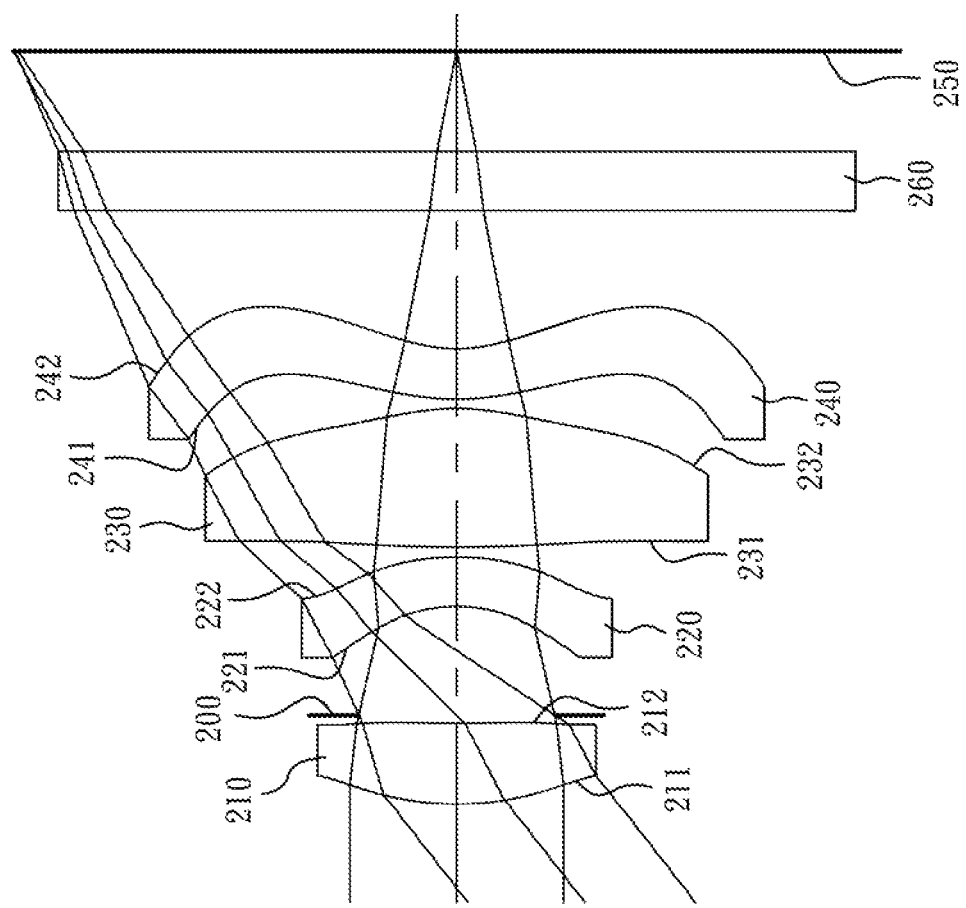
FIG. 3 is a schematic view of an optical image capturing assembly according to the second embodiment of the present disclosure.
Figure 4:
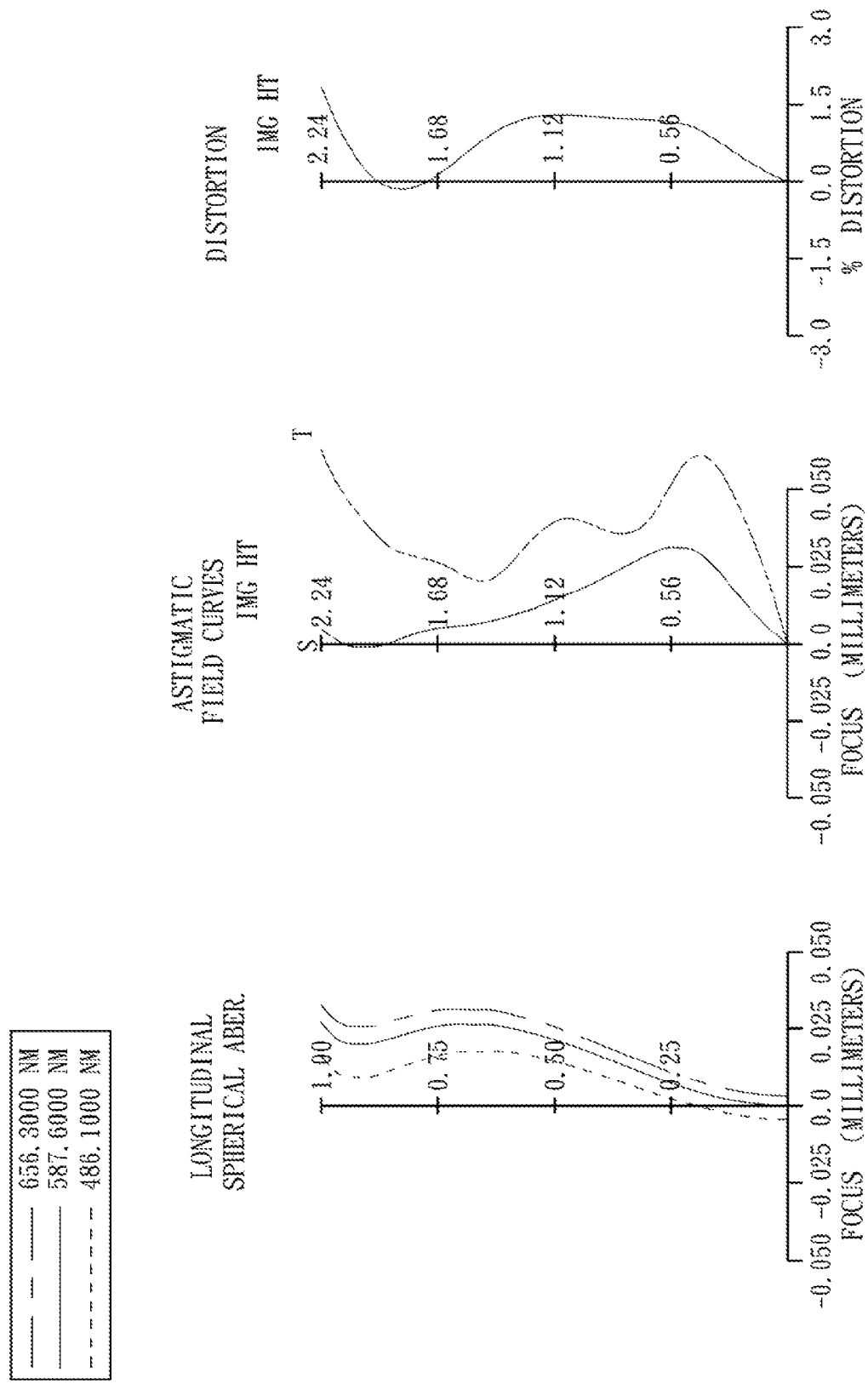
FIG. 4 shows spherical aberration curves, astigmatic field curves and a distortion curve of the optical image capturing assembly according to the second embodiment.

FIG. 3 is a schematic view of an optical image capturing assembly according to the second embodiment of the present disclosure. FIG. 4 shows spherical aberration curves, astigmatic field curves and a distortion curve of the optical image capturing assembly according to the second embodiment. In FIG. 3, the optical image capturing assembly includes, in order from an object side to an image side, the first lens element 210, an aperture stop 200, the second lens element 220, the third lens element 230, the fourth lens element 240, an IR (infrared) cut filter 260 and an image plane 250.

The first lens element 210 is made of plastic material. The first lens element 210 with positive refractive power has a convex object-side surface 211 and a concave image-side surface 212. The object-side surface 211 and the image-side surface 212 of the first lens element 210 are aspheric.

The second lens element 220 is made of plastic material. The second to lens element 220 with negative refractive power has a concave object-side surface 221 and a convex image-side surface 222. The object-side surface 221 and the image-side surface 222 of the second lens element 220 are aspheric.

The third lens element 230 is made of plastic material. The third lens element 230 with positive refractive power has a convex object-side surface 231 and a convex image-side surface 232. The object-side surface 231 and the image-side surface 232 of the third lens element 230 are aspheric.

The fourth lens element 240 is made of plastic material. The fourth lens element 240 with negative refractive power has a convex object-side surface 241 and a concave image-side surface 242. The object-side surface 241 and the image-side surface 242 of the fourth lens element 240 are aspheric. Furthermore, the fourth lens element 240 has inflection points formed on the object-side surface 241 and the image-side surface 242 thereof.

The IR cut filter 260 is made of glass and located between the fourth lens element 240 and the image plane 250, and will not affect the focal length of the optical image capturing assembly.

The equation of the aspheric surface profiles of the above lens elements of the second embodiment is the same as that of the first embodiment, and will not be stated herein again.

The detailed optical data of the second embodiment are shown in Table 3 and the aspheric surface data are shown in Table 4 below.

TABLE 3

2nd Embodiment
f = 2.80 mm, Fno = 2.60, HFOV = 38.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.434520 (ASP) | 0.408 | Plastic | 1.544 | 55.9 | 2.90 |
| 2 | | 14.373200 (ASP) | 0.040 | | | | |
| 3 | Ape. Stop | Plano | 0.549 | | | | |
| 4 | Lens 2 | −0.774350 (ASP) | 0.250 | Plastic | 1.634 | 23.8 | −3.54 |
| 5 | | −1.330710 (ASP) | 0.050 | | | | |
| 6 | Lens 3 | 6.831500 (ASP) | 0.701 | Plastic | 1.544 | 55.9 | 1.74 |
| 7 | | −1.060510 (ASP) | 0.050 | | | | |
| 8 | Lens 4 | 1.322630 (ASP) | 0.250 | Plastic | 1.634 | 23.8 | −2.74 |
| 9 | | 0.695700 (ASP) | 0.700 | | | | |
| 10 | IR-filter | Plano | 0.300 | Glass | 1.516 | 64.1 | — |
| 11 | | Plano | 0.509 | | | | |
| 12 | Image | Plano | — | | | | |

Note:
Reference wavelength (d-line) is 587.6 nm.

TABLE 4

Aspheric Coefficients

| Surface # | 1 | 2 | 4 | 5 |
|---|---|---|---|---|
| k = | −8.75137E−01 | −1.00000E+00 | −8.49115E−01 | 8.36011E−01 |
| A4 = | −3.09101E−03 | −1.30466E−01 | −2.42867E−01 | −2.87889E−01 |
| A6 = | −1.01472E−01 | −1.09584E−01 | 4.32416E−01 | 5.90500E−01 |
| A8 = | −2.92796E−02 | −3.80604E−01 | −1.52982E+00 | 2.01908E−01 |
| A10 = | 5.07425E−02 | −5.98388E−01 | 1.26593E+01 | 1.63812E−01 |
| A12 = | −1.81319E+00 | 2.50729E+00 | −1.90350E+01 | 4.66664E−01 |
| A14 = | 1.77171E+00 | −1.00518E−02 | 9.64690E−01 | 3.72484E−01 |
| A16 = | | | 3.14657E+00 | −1.54695E+00 |

| Surface # | 6 | 7 | 8 | 9 |
|---|---|---|---|---|
| k = | −2.00000E+01 | −1.30563E+01 | −3.79703E+00 | −5.71641E+00 |
| A4 = | −3.19578E−02 | 1.88345E−01 | −1.98719E−01 | −1.27861E−01 |
| A6 = | 1.33601E−02 | −2.43363E−01 | 3.74569E−02 | 1.09937E−02 |
| A8 = | −3.50339E−02 | 7.31739E−02 | −1.54141E−02 | −8.98158E−03 |
| A10 = | 9.83784E−04 | 1.91055E−02 | −7.60810E−03 | 2.90494E−03 |
| A12 = | 1.44711E−02 | −1.26466E−02 | −9.01375E−04 | 2.19658E−04 |
| A14 = | 8.09893E−03 | −5.84045E−03 | 2.81641E−04 | −1.08892E−03 |
| A16 = | −6.36570E−03 | 3.61461E−03 | 8.81257E−04 | 3.16537E−04 |

In the image capturing lens assembly according to the second embodiment, the definitions of f, Fno, HFOV, FOV, V1, V2, R1, R2, R4, R7, R8, T12, CT1, ΣCT, Td, f2, f3, f4, TTL and ImgH are the same as those stated in the first embodiment with corresponding values for the second embodiment. Moreover, these parameters can be calculated from Table 3 as the following values and satisfy the following relationships:

| | |
|---|---|
| f (mm) | 2.80 |
| Fno | 2.60 |
| HFOV (deg.) | 38.0 |
| FOV (deg.) | 76.0 |
| V1 − V2 | 32.1 |
| T12/f | 0.21 |
| CT1/T12 | 0.69 |
| ΣCT/Td | 0.70 |
| R4/f | −0.47 |
| (R1 + R2)/(R1 − R2) | −1.22 |
| (R7 + R8)/(R7 − R8) | 3.22 |
| f/f2 | −0.79 |
| f/f3 | 1.61 |
| f/f4 | −1.02 |
| TTL/ImgH | 1.65 |

Figure 5:
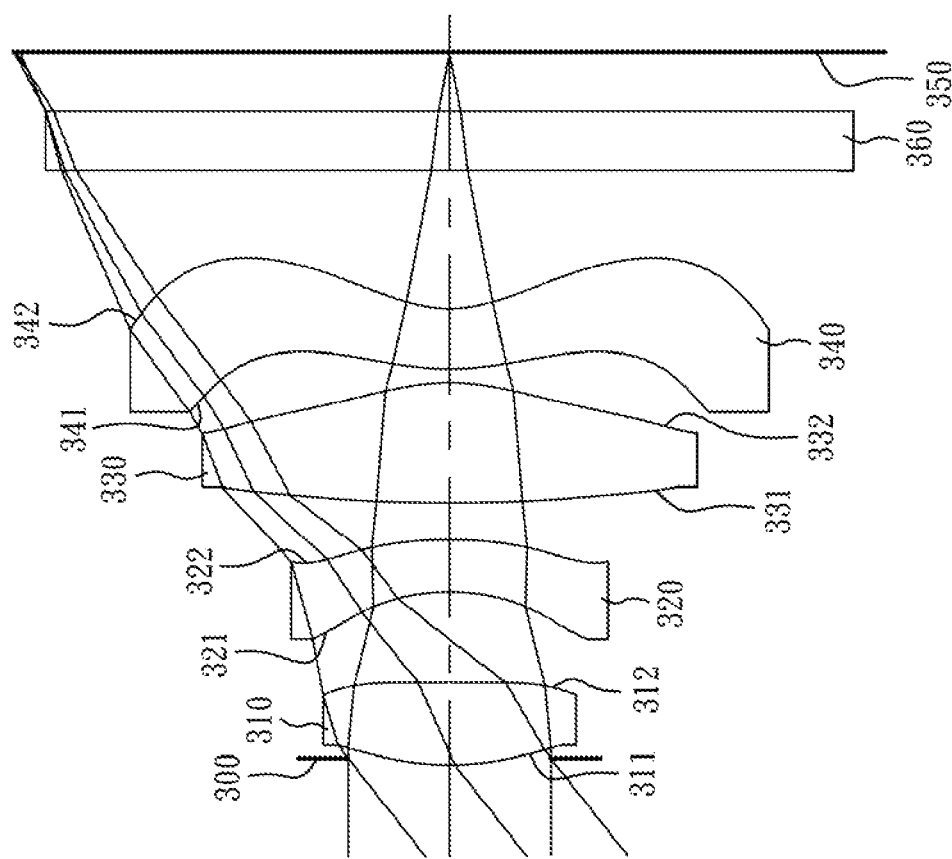
FIG. 5 is a schematic view of an optical image capturing assembly according to the third embodiment of the present disclosure.
Figure 6:
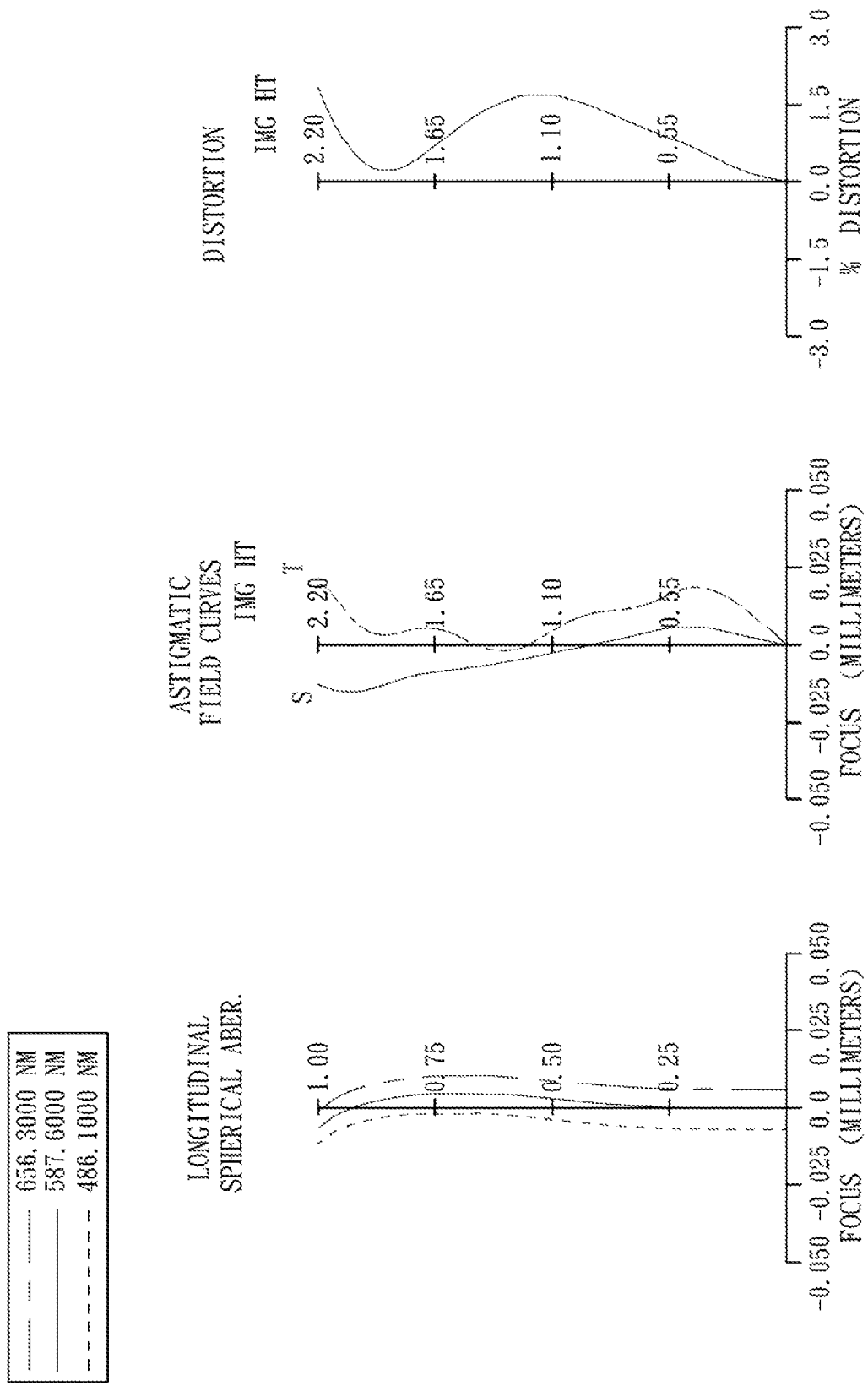
FIG. 6 shows spherical aberration curves, astigmatic field curves and a distortion curve of the optical image capturing assembly according to the third embodiment.

FIG. 5 is a schematic view of an optical image capturing assembly according to the third embodiment of the present disclosure. FIG. 6 shows spherical aberration curves, astigmatic field curves and a distortion curve of the optical image capturing assembly according to the third embodiment. In FIG. 5, the optical image capturing assembly includes, in order from an object side to an image side, an aperture stop 300, the first lens element 310, the second lens element 320, the third lens element 330, the fourth lens element 340, an IR (infrared) cut filter 360 and an image plane 350.

The first lens element 310 is made of plastic material. The first lens element 310 with positive refractive power has a convex object-side surface 311 and a convex image-side surface 312. The object-side surface 311 and the image-side surface 312 of the first lens element 310 are aspheric.

The second lens element 320 is made of plastic material. The second lens element 320 with negative refractive power has a concave object-side surface 321 and a convex image-side surface 322. The object-side surface 321 and the image-side surface 322 of the second lens element 320 are aspheric.

The third lens element 330 is made of plastic material. The third lens element 330 with positive refractive power has a convex object-side surface 331 and a convex image-side surface 332. The object-side surface 331 and the image-side surface 332 of the third lens element 330 are aspheric.

The fourth lens element 340 is made of plastic material. The fourth lens element 340 with negative refractive power has a convex object-side surface 341 and a concave image-side surface 342. The object-side surface 341 and the image-side surface 342 of the fourth lens element 340 are aspheric. Furthermore, the fourth lens element 340 has inflection points formed on the object-side surface 341 and the image-side surface 342 thereof.

The IR cut filter 360 is made of glass and located between the fourth lens element 340 and the image plane 350, and will not affect the focal length of the optical image capturing assembly.

The equation of the aspheric surface profiles of the above lens elements of the third embodiment is the same as that of the first embodiment, and will not be stated herein again.

The detailed optical data of the third embodiment are shown in Table 5 and the aspheric surface data are shown in Table 6 below.

TABLE 5

3rd Embodiment
f = 2.77 mm, Fno = 2.70, HFOV = 38.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.034 | | | | |

TABLE 5-continued

3rd Embodiment
f = 2.77 mm, Fno = 2.70, HFOV = 38.0 deg.

| Surface # | | Curvature Radius | Thickness | Material | Index | Abbe # | Focal length |
|---|---|---|---|---|---|---|---|
| 2 | Lens 1 | 1.433490 (ASP) | 0.416 | Plastic | 1.544 | 55.9 | 2.58 |
| 3 | | −66.967400 (ASP) | 0.455 | | | | |
| 4 | Lens 2 | −1.107850 (ASP) | 0.266 | Plastic | 1.650 | 21.4 | −3.53 |
| 5 | | −2.343510 (ASP) | 0.188 | | | | |
| 6 | Lens 3 | 9.762800 (ASP) | 0.607 | Plastic | 1.544 | 55.9 | 1.74 |
| 7 | | −1.024250 (ASP) | 0.070 | | | | |
| 8 | Lens 4 | 1.455310 (ASP) | 0.300 | Plastic | 1.544 | 55.9 | −2.21 |
| 9 | | 0.610670 (ASP) | 0.700 | | | | |
| 10 | IR-filter | Plano | 0.300 | Glass | 1.516 | 64.1 | — |
| 11 | | Plano | 0.302 | | | | |
| 12 | Image | Plano | — | | | | |

Note:
Reference wavelength (d-line) is 587.6 nm.

TABLE 6

Aspheric Coefficients

| Surface # | 2 | 3 | 4 | 5 |
|---|---|---|---|---|
| k = | −1.41126E+00 | −1.00000E+00 | −1.41060E−01 | 2.48501E+00 |
| A4 = | −1.15519E−02 | −2.13068E−01 | −3.52492E−01 | −3.32049E−01 |
| A6 = | −1.72412E−01 | −1.97363E−01 | 3.03350E−01 | 5.29170E−01 |
| A8 = | 1.79664E−02 | −7.10262E−01 | 1.29379E+00 | 2.48759E−01 |
| A10 = | −1.23058E+00 | 1.02415E+00 | 4.04225E−01 | 5.69348E−02 |
| A12 = | 6.12088E−02 | −1.26662E+00 | −3.11991E+00 | −1.79670E−02 |
| A14 = | — | — | 8.49867E−01 | 7.05101E−03 |
| A16 = | — | — | 2.02877E+00 | −2.24470E−01 |

| Surface # | 6 | 7 | 8 | 9 |
|---|---|---|---|---|
| k = | −1.35765E+01 | −8.52026E+00 | −2.44497E+00 | −4.04033E+00 |
| A4 = | 3.75564E−02 | 1.30884E−01 | −3.39686E−01 | −2.08500E−01 |
| A6 = | −3.07716E−02 | −7.44833E−02 | 8.39754E−02 | 8.94712E−02 |
| A8 = | −7.38100E−03 | −9.99408E−03 | 2.27408E−02 | −3.06496E−02 |
| A10 = | 2.32895E−03 | 4.49018E−03 | −1.80272E−02 | 2.35864E−03 |
| A12 = | 4.88634E−03 | 2.24452E−03 | −1.07524E−02 | 9.36178E−04 |
| A14 = | 3.38168E−03 | 9.10130E−04 | −8.12275E−04 | −4.12665E−04 |
| A16 = | −1.97695E−03 | 2.97837E−04 | 3.46998E−03 | 7.12320E−05 |

In the image capturing lens assembly according to the third embodiment, the definitions of f, Fno, HFOV, FOV, V1, V2, R1, R2, R4, R7, R8, T12, CT1, ΣCT, Td, f2, f3, f4, TTL and ImgH are the same as those stated in the first embodiment with corresponding values for the third embodiment. Moreover, these parameters can be calculated from Table 5 as the following values and satisfy the following relationships:

| | |
|---|---|
| f (mm) | 2.77 |
| Fno | 2.70 |
| HFOV (deg.) | 38.0 |
| FOV (deg.) | 76.0 |
| V1 − V2 | 34.5 |
| T12/f | 0.16 |
| CT1/T12 | 0.91 |
| ΣCT/Td | 0.69 |
| R4/f | −0.85 |
| (R1 + R2)/(R1 − R2) | −0.96 |
| (R7 + R8)/(R7 − R8) | 2.45 |
| f/f2 | −0.78 |
| f/f3 | 1.59 |
| f/f4 | −1.25 |
| TTL/ImgH | 1.59 |

Figure 7:
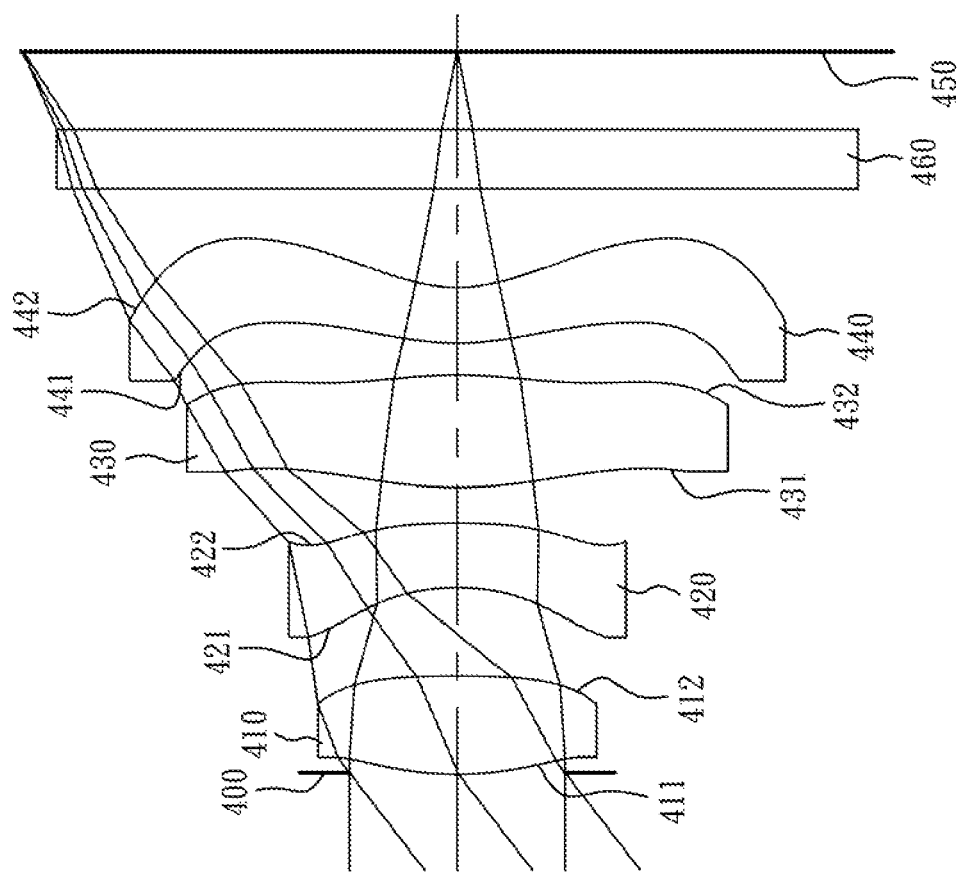
FIG. 7 is a schematic view of an optical image capturing assembly according to the fourth embodiment of the present disclosure.
Figure 8:
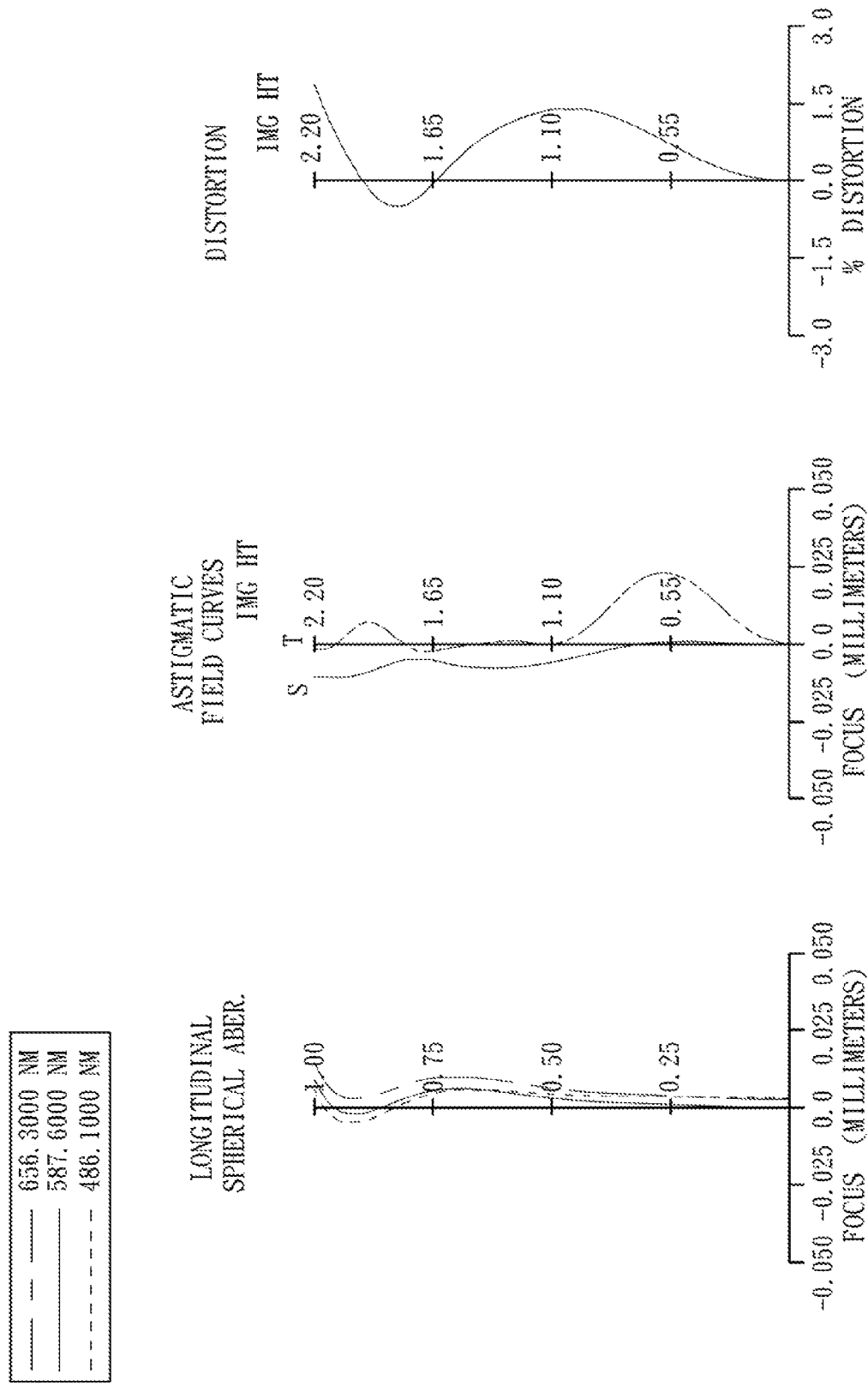
FIG. 8 shows spherical aberration curves, astigmatic field curves and a distortion curve of the optical image capturing assembly according to the fourth embodiment.

FIG. 7 is a schematic view of an optical image capturing assembly according to the fourth embodiment of the present disclosure. FIG. 8 shows spherical aberration curves, astigmatic field curves and a distortion curve of the optical image capturing assembly according to the fourth embodiment. In FIG. 7, the optical image capturing assembly includes, in order from an object side to an image side, an aperture stop 400, the first lens element 410, the second lens element 420, the third lens element 430, the fourth lens element 440, an IR (infrared) cut filter 460 and an image plane 450.

The first lens element 410 is made of plastic material. The first lens element 410 with positive refractive power has a convex object-side surface 411 and a convex image-side surface 412. The object-side surface 411 and the image-side surface 412 of the first lens element 410 are aspheric.

The second lens element 420 is made of plastic material. The second lens element 420 with negative refractive power has a concave object-side surface 421 and a convex image-side surface 422. The object-side surface 421 and the image-side surface 422 of the second lens element 420 are aspheric.

Furthermore, the second lens element 420 has inflection points formed on the image-side surface 422 thereof.

The third lens element 430 is made of plastic material. The third lens element 430 with positive refractive power has a convex object-side surface 431 and a convex image-side surface 432. The object-side surface 431 and the image-side surface 432 of the third lens element 430 are aspheric. Furthermore, the third lens element 430 has inflection points formed on the object-side surface 431 and the image-side surface 432 thereof.

The fourth lens element 440 is made of plastic material. The fourth lens element 440 with negative refractive power has a convex object-side surface 441 and a concave image-side surface 442. The object-side surface 441 and the image-side surface 442 of the fourth lens element 440 are aspheric.

Furthermore, the fourth lens element 440 has inflection points formed on the object-side surface 441 and the image-side surface 442 thereof.

The IR cut filter 460 is made of glass and located between the fourth lens element 440 and the image plane 450, and will not affect the focal length of the optical image capturing assembly.

The equation of the aspheric surface profiles of the above lens elements of the fourth embodiment is the same as that of the first embodiment, and will not be stated herein again.

The detailed optical data of the fourth embodiment are shown in Table 7 and the aspheric surface data are shown in Table 8 below.

TABLE 7

4th Embodiment
f = 2.83 mm, Fno = 2.60, HFOV = 37.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.009 | | | | |
| 2 | Lens 1 | 1.623880 (ASP) | 0.494 | Plastic | 1.544 | 55.9 | 2.43 |
| 3 | | −6.296900 (ASP) | 0.446 | | | | |
| 4 | Lens 2 | −1.152700 (ASP) | 0.329 | Plastic | 1.650 | 21.4 | −2.52 |
| 5 | | −4.320700 (ASP) | 0.179 | | | | |
| 6 | Lens 3 | 2.010290 (ASP) | 0.570 | Plastic | 1.535 | 56.3 | 2.02 |
| 7 | | −2.113360 (ASP) | 0.158 | | | | |
| 8 | Lens 4 | 1.389990 (ASP) | 0.280 | Plastic | 1.535 | 56.3 | −3.29 |
| 9 | | 0.722130 (ASP) | 0.500 | | | | |
| 10 | IR-filter | Plano | 0.300 | Glass | 1.516 | 64.1 | — |
| 11 | | Plano | 0.396 | | | | |
| 12 | Image | Plano | — | | | | |

Note:
Reference wavelength (d-line) is 587.6 nm.

TABLE 8

Aspheric Coefficients

| Surface # | 2 | 3 | 4 | 5 |
|---|---|---|---|---|
| k = | −2.10493E+00 | −1.00000E+00 | −3.43001E−02 | 1.26006E+01 |
| A4 = | −5.08997E−02 | −2.80419E−01 | −4.20448E−01 | −6.49257E−01 |
| A6 = | −2.83875E−02 | −8.61338E−02 | 3.61420E−01 | 9.07464E−01 |
| A8 = | −1.51367E+00 | −1.03989E+00 | 1.77120E+00 | −3.54450E−02 |
| A10 = | 4.64656E+00 | 3.02268E+00 | 5.08594E−01 | 1.56724E−01 |
| A12 = | −7.50289E+00 | −3.54204E+00 | −3.94783E+00 | 8.48545E−02 |
| A14 = | — | — | −1.71109E+00 | −2.55333E−01 |
| A16 = | — | — | 4.79244E+00 | −1.13989E−01 |

| Surface # | 6 | 7 | 8 | 9 |
|---|---|---|---|---|
| k = | −1.13082E+01 | −2.00000E+01 | −6.79866E+00 | −3.88762E+00 |
| A4 = | −1.22332E−01 | 2.89089E−01 | −2.43741E−01 | −2.24582E−01 |
| A6 = | 9.82104E−02 | −2.38975E−01 | 1.42295E−01 | 1.28049E−01 |
| A8 = | −5.31857E−02 | 5.48657E−02 | −2.38090E−02 | −4.93485E−02 |
| A10 = | −1.74670E−02 | 4.55855E−03 | −1.61454E−02 | 5.30870E−03 |
| A12 = | 1.07819E−02 | −3.13369E−03 | −8.91463E−04 | 1.43910E−03 |
| A14 = | 1.02890E−02 | −1.30820E−03 | 8.80385E−04 | −9.34772E−04 |
| A16 = | −4.60023E−03 | 5.38201E−04 | 4.43877E−04 | 1.78029E−04 |

In the image capturing lens assembly according to the fourth embodiment, the definitions of f, Fno, HFOV, FOV, V1, V2, R1, R2, R4, R7, R8, T12, CT1, ΣCT, Td, f2, f3, f4, TTL and ImgH are the same as those stated in the first embodiment with corresponding values for the fourth embodiment. Moreover, these parameters can be calculated from Table 7 as the following values and satisfy the following relationships:

| | |
|---|---|
| f (mm) | 2.83 |
| Fno | 2.60 |
| HFOV (deg.) | 37.4 |
| FOV (deg.) | 74.8 |
| V1 − V2 | 34.5 |
| T12/f | 0.16 |
| CT1/T12 | 1.11 |
| ΣCT/Td | 0.68 |
| R4/f | −1.53 |
| (R1 + R2)/(R1 − R2) | −0.59 |
| (R7 + R8)/(R7 − R8) | 3.16 |
| f/f2 | −1.21 |
| f/f3 | 1.40 |
| f/f4 | −0.86 |
| TTL/ImgH | 1.61 |

Figure 9:
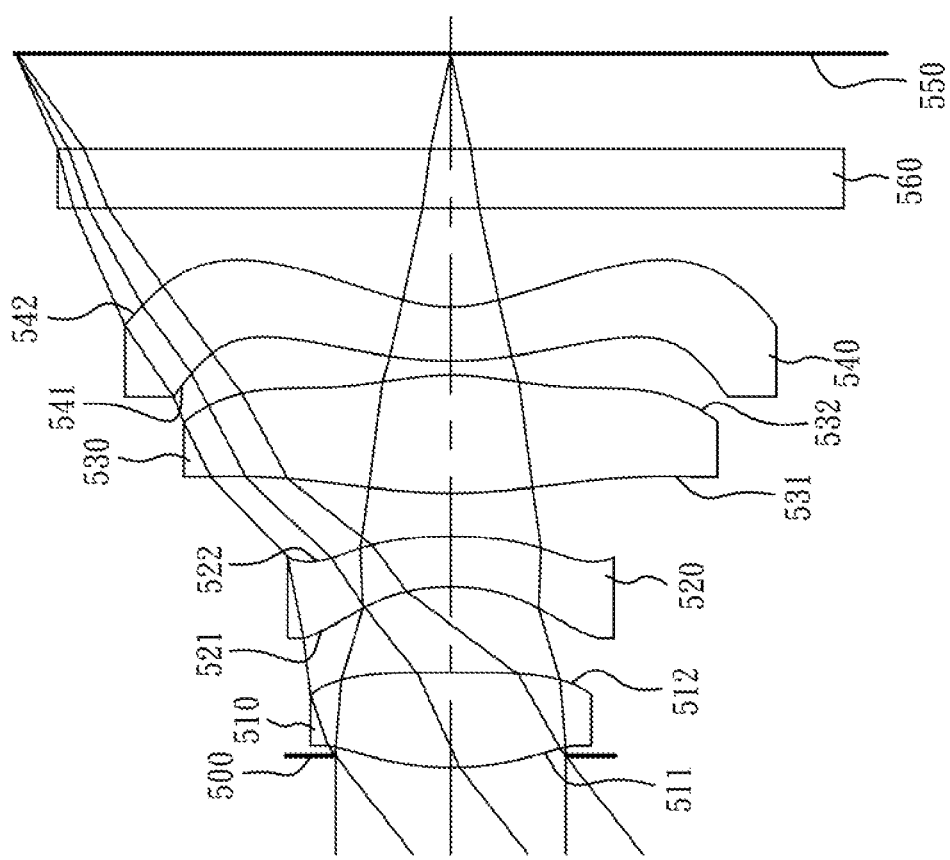
FIG. 9 is a schematic view of an optical image capturing assembly according to the fifth embodiment of the present disclosure.
Figure 10:
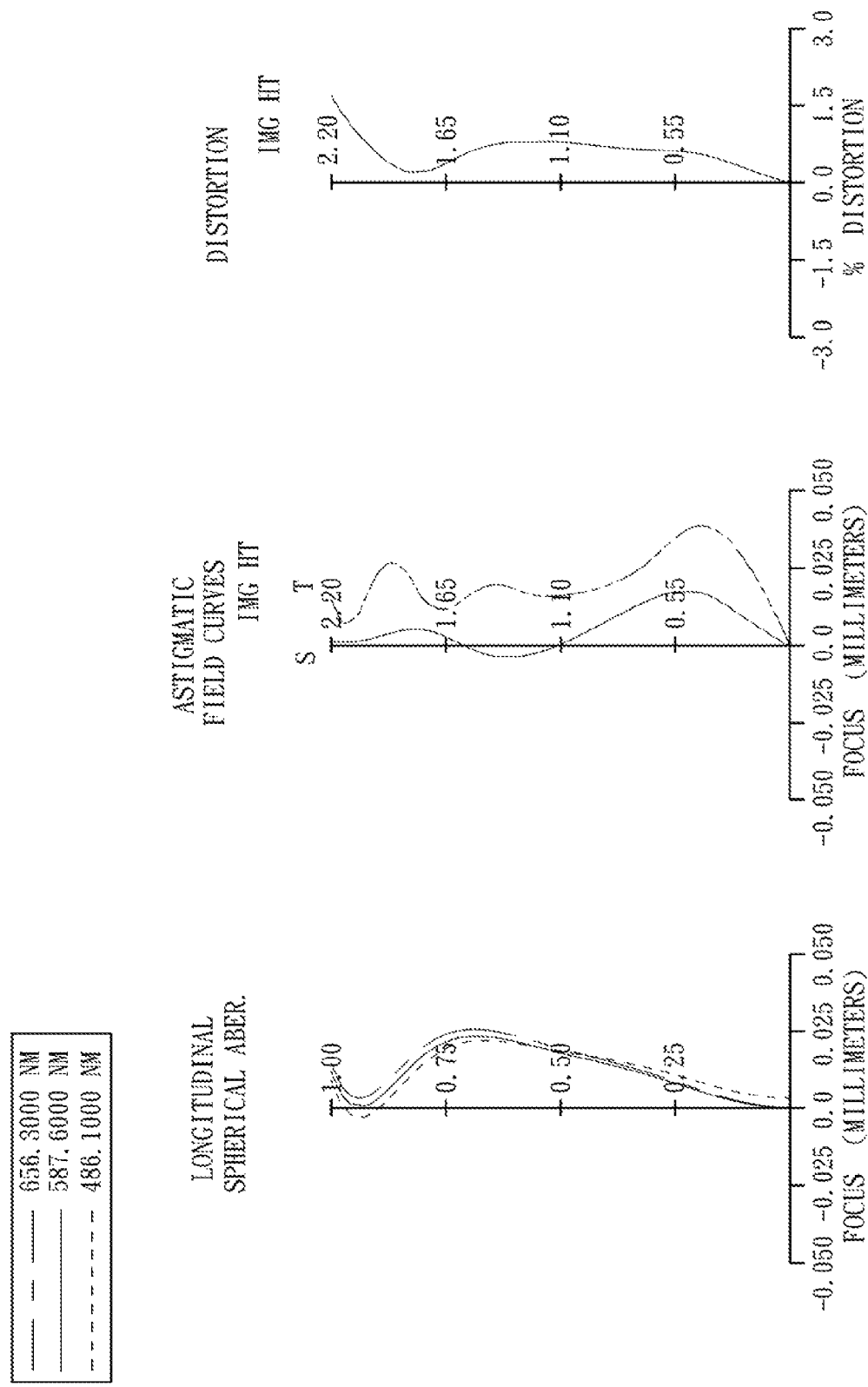
FIG. 10 shows spherical aberration curves, astigmatic field curves and a distortion curve of the optical image capturing assembly according to the fifth is embodiment.

FIG. 9 is a schematic view of an optical image capturing assembly according to the fifth embodiment of the present disclosure. FIG. 10 shows spherical aberration curves, astigmatic field curves and a distortion curve of the optical image capturing assembly according to the fifth embodiment. In FIG. 9, the optical image capturing assembly includes, in order from an object side to an image side, an aperture stop 500, the first lens element 510, the second lens element 520, the third lens element 530, the fourth lens element 540, an IR (infrared) cut filter 560 and an image plane 550.

The first lens element 510 is made of plastic material. The first lens element 510 with positive refractive power has a convex object-side surface 511 and a convex image-side surface 512. The object-side surface 511 and the image-side surface 512 of the first lens element 510 are aspheric.

The second lens element 520 is made of plastic material. The second is lens element 520 with negative refractive power has a concave object-side surface 521 and a convex image-side surface 522. The object-side surface 521 and the image-side surface 522 of the second lens element 520 are aspheric. Furthermore, the second lens element 520 has inflection points formed on the image-side surface 522 thereof.

The third lens element 530 is made of plastic material. The third lens element 530 with positive refractive power has a convex object-side surface 531 and a convex image-side surface 532. The object-side surface 531 and the image-side surface 532 of the third lens element 530 are aspheric. Furthermore, the third lens element 530 has inflection points formed on the object-side surface 531 and the image-side surface 532 thereof.

The fourth lens element 540 is made of plastic material. The fourth lens element 540 with negative refractive power has a convex object-side surface 541 and a concave image-side surface 542. The object-side surface 541 and the image-side surface 542 of the fourth lens element 540 are aspheric. Furthermore, the fourth lens element 540 has inflection points formed on the object-side surface 541 and the image-side surface 542 thereof.

The IR cut filter 560 is made of glass and located between the fourth lens element 540 and the image plane 550, and will not affect the focal length of the optical image capturing assembly.

The equation of the aspheric surface profiles of the above lens elements of the fifth embodiment is the same as that of the first embodiment, and will not be stated herein again.

The detailed optical data of the fifth embodiment are shown in Table 9 and the aspheric surface data are shown in Table 10 below.

TABLE 9

5th Embodiment
f = 2.76 mm, Fno = 2.38, HFOV = 37.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.058 | | | | |
| 2 | Lens 1 | 1.479710 (ASP) | 0.478 | Plastic | 1.544 | 55.9 | 2.57 |
| 3 | | −23.066000 (ASP) | 0.432 | | | | |
| 4 | Lens 2 | −1.081580 (ASP) | 0.256 | Plastic | 1.634 | 23.8 | −3.13 |
| 5 | | −2.595590 (ASP) | 0.220 | | | | |
| 6 | Lens 3 | 2.777780 (ASP) | 0.598 | Plastic | 1.544 | 55.9 | 1.58 |
| 7 | | −1.148530 (ASP) | 0.070 | | | | |
| 8 | Lens 4 | 1.873500 (ASP) | 0.270 | Plastic | 1.634 | 23.8 | −1.97 |
| 9 | | 0.706900 (ASP) | 0.500 | | | | |
| 10 | IR-filter | Plano | 0.300 | Glass | 1.516 | 64.1 | — |
| 11 | | Plano | 0.485 | | | | |
| 12 | Image | Plano | — | | | | |

Note:
Reference wavelength (d-line) is 587.6 nm.

TABLE 10

Aspheric Coefficients

| Surface # | 2 | 3 | 4 | 5 |
|---|---|---|---|---|
| k = | −1.58176E+00 | −1.00000E+00 | 4.04558E−01 | 4.64970E+00 |
| A4 = | −3.31918E−02 | −2.55584E−01 | −5.20958E−01 | −6.77623E−01 |
| A6 = | 1.88849E−01 | −4.82076E−02 | 7.22308E−01 | 1.09765E+00 |

TABLE 10-continued

| Aspheric Coefficients | | | | |
|---|---|---|---|---|
| A8 = | −2.46261E+00 | −1.47016E+00 | 2.20292E+00 | 1.26331E−01 |
| A10 = | 6.79053E+00 | 4.02830E+00 | 6.98326E−01 | 4.83474E−01 |
| A12 = | −8.54046E+00 | −4.20033E+00 | −6.22777E+00 | −1.79109E−01 |
| A14 = | — | — | −7.79857E−01 | −1.18633E+00 |
| A16 = | — | — | 6.03233E+00 | 4.65992E−01 |

| Surface # | 6 | 7 | 8 | 9 |
|---|---|---|---|---|
| k = | −2.91192E+00 | −1.57224E+01 | −1.79598E+00 | −6.32205E+00 |
| A4 = | −1.32076E−01 | 4.19956E−01 | −1.76170E−01 | −1.13682E−01 |
| A6 = | 6.28249E−02 | −4.58137E−01 | 9.22004E−02 | 6.60126E−02 |
| A8 = | −1.28954E−02 | 1.62644E−01 | −4.59993E−02 | −4.43086E−02 |
| A10 = | −1.43900E−02 | 3.85953E−03 | −1.16433E−02 | 7.17193E−03 |
| A12 = | 2.96171E−03 | −1.35248E−02 | 2.25143E−03 | 2.07002E−03 |
| A14 = | 7.17416E−03 | −3.76984E−03 | 1.70269E−03 | −8.68317E−04 |
| A16 = | −2.52067E−03 | 2.46792E−03 | 1.10643E−04 | 9.84146E−05 |

In the image capturing lens assembly according to the fifth embodiment, the definitions of f, Fno, HFOV, FOV, V1, V2, R1, R2, R4, R7, R8, T12, CT1, ΣCT, Td, f2, f3, f4, TTL and ImgH are the same as those stated in the first embodiment with corresponding values for the fifth embodiment. Moreover, these parameters can be calculated from Table 9 as the following values and satisfy the following relationships:

| | |
|---|---|
| f (mm) | 2.76 |
| Fno | 2.38 |
| HFOV (deg.) | 37.9 |
| FOV (deg.) | 75.8 |
| V1 − V2 | 32.1 |
| T12/f | 0.16 |
| CT1/T12 | 1.11 |
| ΣCT/Td | 0.69 |
| R4/f | −0.94 |
| (R1 + R2)/(R1 − R2) | −0.88 |
| (R7 + R8)/(R7 − R8) | 2.21 |
| f/f2 | −0.88 |
| f/f3 | 1.75 |
| f/f4 | −1.41 |
| TTL/ImgH | 1.59 |

Figure 11:
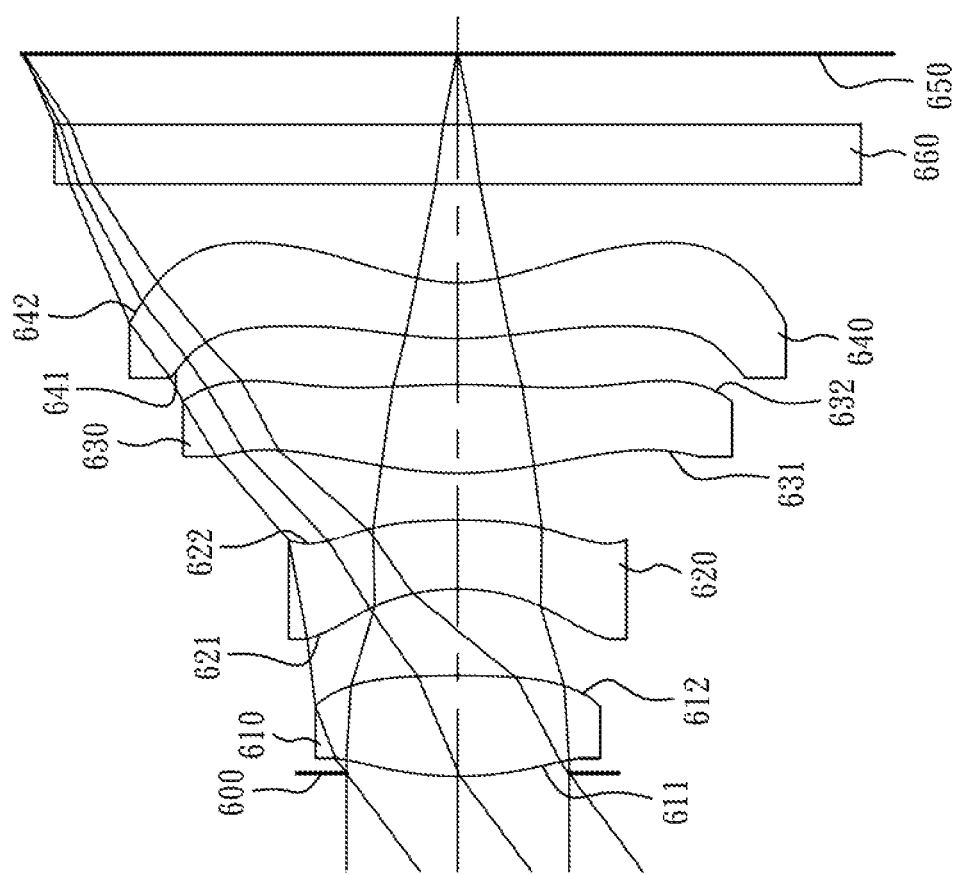
FIG. 11 is a schematic view of an optical image capturing assembly according to the sixth embodiment of the present disclosure.
Figure 12:
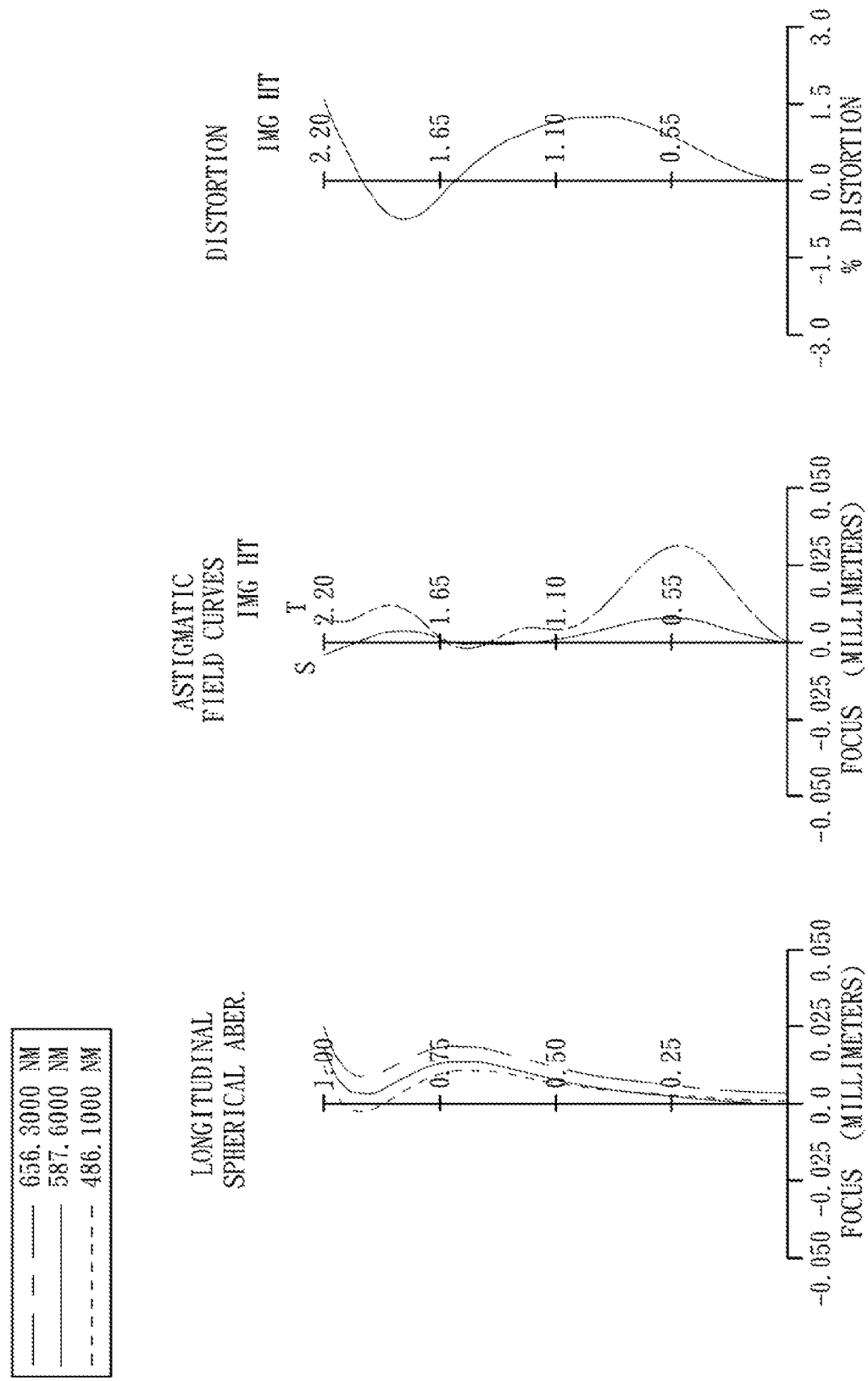
FIG. 12 shows spherical aberration curves, astigmatic field curves and a distortion curve of the optical image capturing assembly according to the sixth embodiment.

FIG. 11 is a schematic view of an optical image capturing assembly according to the sixth embodiment of the present disclosure. FIG. 12 shows spherical aberration curves, astigmatic field curves and a distortion curve of the optical image capturing assembly according to the sixth embodiment. In FIG. 11, the optical image capturing assembly includes, in order from an object side to an image side, an aperture stop 600, the first lens element 610, the second lens element 620, the third lens element 630, the fourth lens element 640, an IR (infrared) cut filter 660 and an image plane 650.

The first lens element 610 is made of plastic material. The first lens element 610 with positive refractive power has a convex object-side surface 611 and a convex image-side surface 612. The object-side surface 611 and the image-side surface 612 of the first lens element 610 are aspheric.

The second lens element 620 is made of plastic material. The second lens element 620 with negative refractive power has a concave object-side surface 621 and a convex image-side surface 622. The object-side surface 621 and the image-side surface 622 of the second lens element are aspheric. Furthermore, the second lens element 620 has inflection points formed on the image-side surface 622 thereof.

The third lens element 630 is made of plastic material. The third lens element 630 with positive refractive power has a convex object-side surface 631 and a convex image-side surface 632. The object-side surface 631 and the image-side surface 632 of the third lens element 630 are aspheric. Furthermore, the third lens element 630 has inflection points formed on the object-side surface 631 and the image-side surface 632 thereof.

The fourth lens element 640 is made of plastic material. The fourth lens element 640 with negative refractive power has a convex object-side surface 641 and a concave image-side surface 642. The object-side surface 641 and to the image-side surface 642 of the fourth lens element 640 are aspheric. Furthermore, the fourth lens element 640 has inflection points formed on the object-side surface 641 and the image-side surface 642 thereof.

The IR cut filter 660 is made of glass and located between the fourth lens element 640 and the image plane 650, and will not affect the focal length of the optical image capturing assembly.

The equation of the aspheric surface profiles of the above lens elements of the sixth embodiment is the same as that of the first embodiment, and will not be stated herein again.

The detailed optical data of the sixth embodiment are shown in Table 11 and the aspheric surface data are shown in Table 12 below.

TABLE 11

6th Embodiment
f = 2.90 mm, Fno = 2.58, HFOV = 36.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.016 | | | | |
| 2 | Lens 1 | 1.602640 (ASP) | 0.506 | Plastic | 1.544 | 55.9 | 2.41 |
| 3 | | −6.424700 (ASP) | 0.437 | | | | |

TABLE 11-continued

6th Embodiment
f = 2.90 mm, Fno = 2.58, HFOV = 36.7 deg.

| Surface # | | Curvature Radius | Thickness | Material | Index | Abbe # | Focal length |
|---|---|---|---|---|---|---|---|
| 4 | Lens 2 | −1.160600 (ASP) | 0.352 | Plastic | 1.650 | 21.4 | −2.75 |
| 5 | | −3.700000 (ASP) | 0.234 | | | | |
| 6 | Lens 3 | 1.741960 (ASP) | 0.451 | Plastic | 1.535 | 56.3 | 2.26 |
| 7 | | −3.571400 (ASP) | 0.229 | | | | |
| 8 | Lens 4 | 1.761330 (ASP) | 0.282 | Plastic | 1.544 | 55.9 | −3.38 |
| 9 | | 0.848400 (ASP) | 0.500 | | | | |
| 10 | IR-filter | Plano | 0.300 | Glass | 1.516 | 64.1 | — |
| 11 | | Plano | 0.361 | | | | |
| 12 | Image | Plano | — | | | | |

Note:
Reference wavelength (d-line) is 587.6 nm.

TABLE 12

Aspheric Coefficients

| Surface # | 2 | 3 | 4 | 5 |
|---|---|---|---|---|
| k = | −2.01514E+00 | −1.00000E+00 | −4.40021E−04 | 1.15822E+01 |
| A4 = | −4.79225E−02 | −2.83843E−01 | −4.25710E−01 | −6.17189E−01 |
| A6 = | −1.45656E−02 | −7.45977E−02 | 3.72018E−01 | 9.04431E−01 |
| A8 = | −1.55471E+00 | −1.04824E+00 | 1.75835E+00 | −4.41385E−02 |
| A10 = | 4.67042E+00 | 2.98407E+00 | 4.61533E−01 | 1.65044E−01 |
| A12 = | −7.15703E+00 | −3.34234E+00 | −3.96880E+00 | 1.13925E−01 |
| A14 = | — | — | −1.31390E+00 | −2.41253E−01 |
| A16 = | — | — | 4.39877E+00 | −1.38808E−01 |

| Surface # | 6 | 7 | 8 | 9 |
|---|---|---|---|---|
| k = | −8.68950E+00 | −2.00000E+01 | −1.95743E+01 | −4.86793E+00 |
| A4 = | −1.15411E−01 | 3.22431E−01 | −2.00623E−01 | −2.11368E−01 |
| A6 = | 8.87996E−02 | −2.50108E−01 | 1.42096E−01 | 1.22779E−01 |
| A8 = | −5.53432E−02 | 5.25556E−02 | −2.53854E−02 | −4.63015E−02 |
| A10 = | −1.76363E−02 | 4.99744E−03 | −1.52690E−02 | 5.25005E−03 |
| A12 = | 1.08432E−02 | −2.69277E−03 | −4.33976E−04 | 1.22053E−03 |
| A14 = | 1.04334E−02 | −1.23635E−03 | 8.69290E−04 | −9.72234E−04 |
| A16 = | −4.51965E−03 | 4.72854E−04 | 3.13089E−04 | 1.94880E−04 |

In the image capturing lens assembly according to the sixth embodiment, the definitions of f, Fno, HFOV, FOV, V1, V2, R1, R2, R4, R7, R8, T12, CT1, ΣCT, Td, f2, f3, f4, TTL and ImgH are the same as those stated in the first embodiment with corresponding values for the sixth embodiment. Moreover, these parameters can be calculated from Table 11 as the following values and satisfy the following relationships:

| | |
|---|---|
| f (mm) | 2.90 |
| Fno | 2.58 |
| HFOV (deg.) | 36.7 |
| FOV (deg.) | 73.4 |
| V1 − V2 | 34.5 |
| T12/f | 0.15 |
| CT1/T12 | 1.16 |
| ΣCT/Td | 0.64 |
| R4/f | −1.28 |
| (R1 + R2)/(R1 − R2) | −0.60 |
| (R7 + R8)/(R7 − R8) | 2.86 |
| f/f2 | −1.05 |
| f/f3 | 1.29 |
| f/f4 | −0.86 |
| TTL/ImgH | 1.61 |

Figure 13:
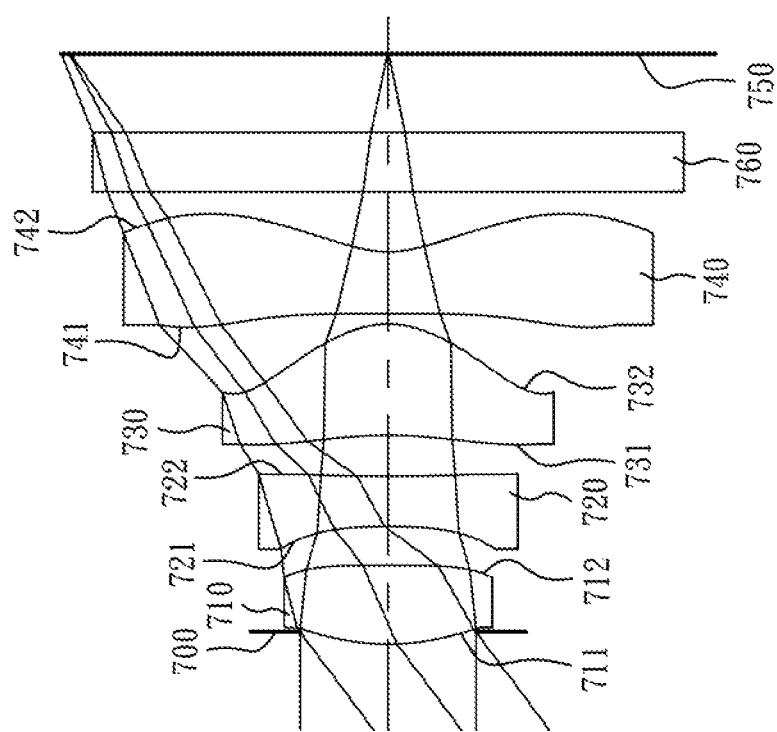
FIG. 13 is a schematic view of an optical image capturing assembly according to the seventh embodiment of the present disclosure.
Figure 14:
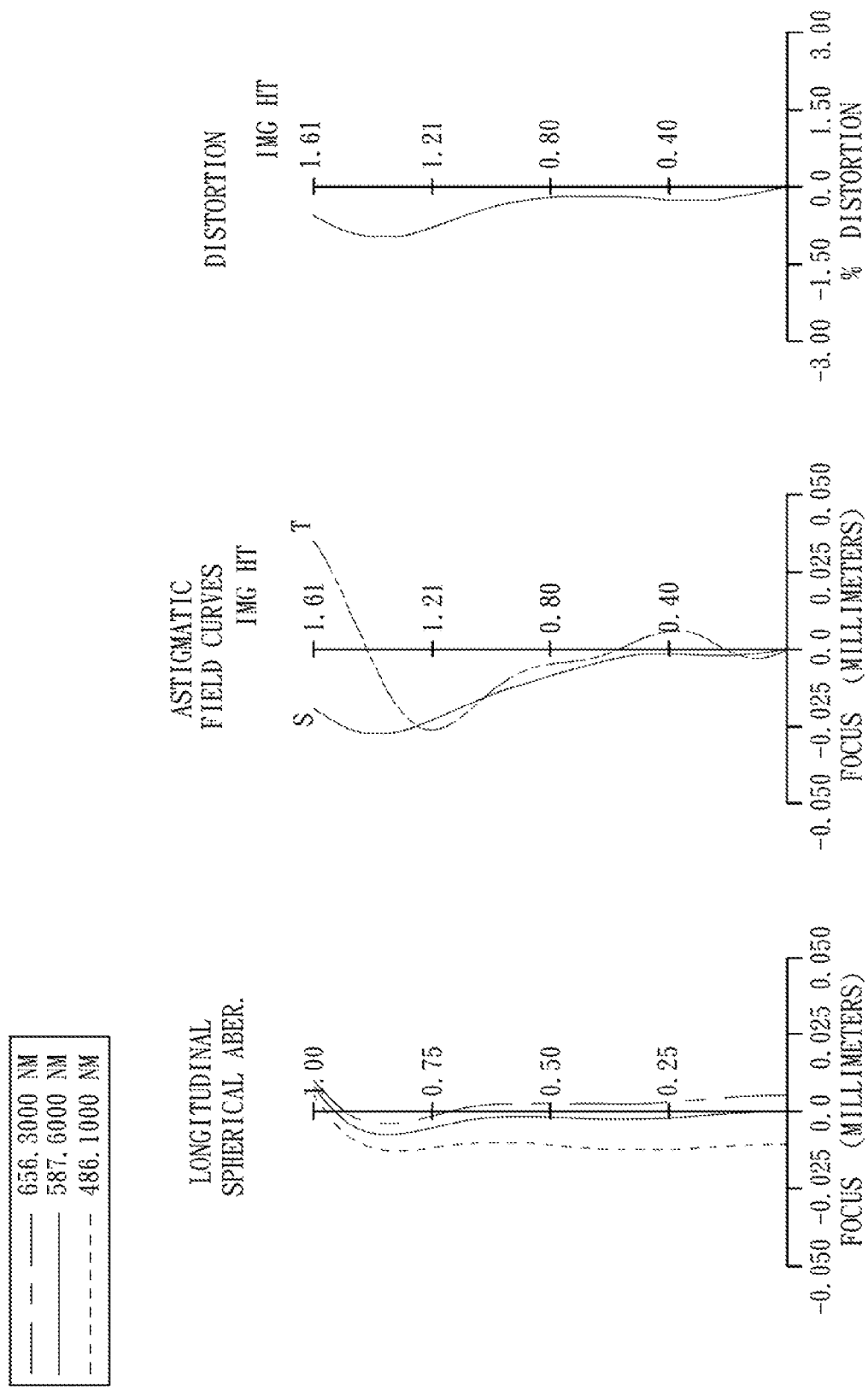
FIG. 14 shows spherical aberration curves, astigmatic field curves and a distortion curve of the optical image capturing assembly according to the seventh embodiment.

FIG. 13 is a schematic view of an optical image capturing assembly according to the seventh embodiment of the present disclosure. FIG. 14 shows spherical aberration curves, astigmatic field curves and a distortion curve of the optical image capturing assembly according to the seventh embodiment. In FIG. 13, the optical image capturing assembly includes, in order from an object side to an image side, an aperture stop 700, the first lens element 710, the second lens element 720, the third lens element 730, the fourth lens element 740, an IR (infrared) cut filter 760 and an image plane 750.

The first lens element 710 is made of plastic material. The first lens element 710 with positive refractive power has a convex object-side surface 711 and a convex image-side surface 712. The object-side surface 711 and the image-side surface 712 of the first lens element 710 are aspheric.

The second lens element 720 is made of plastic material. The second lens element 720 with negative refractive power has a concave object-side surface 721 and a concave image-side surface 722. The object-side surface 721 and the image-side surface 722 of the second lens element 720 are aspheric.

The third lens element 730 is made of plastic material. The third lens element 730 with positive refractive power has a concave object-side surface 731 and a convex image-side surface 732. The object-side surface 731 and the image-side surface 732 of the third lens element 730 are aspheric. Furthermore, the third lens element 730 has inflection points formed on the object-side surface 731 and the image-side surface 732 thereof.

The fourth lens element 740 is made of plastic material. The fourth lens to element 740 with negative refractive power has a concave object-side surface 741 and a concave image-side surface 742. The object-side surface 741 and the image-side surface 742 of the fourth lens element 740 are aspheric. Furthermore, the fourth lens element 740 has inflection points formed on the object-side surface 741 and the image-side surface 742 thereof.

The IR cut filter 760 is made of glass and located between the fourth lens element 740 and the image plane 750, and will not affect the focal length of the optical image capturing assembly.

The equation of the aspheric surface profiles of the above lens elements of the seventh embodiment is the same as that of the first embodiment, and will not be stated herein again.

The detailed optical data of the seventh embodiment are shown in Table 13 and the aspheric surface data are shown in Table 14 below.

TABLE 13

7th Embodiment
f = 2.18 mm, Fno = 2.46, HFOV = 36.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.061 | | | | |
| 2 | Lens 1 | 1.199870 (ASP) | 0.395 | Plastic | 1.544 | 55.9 | 2.02 |
| 3 | | −11.888900 (ASP) | 0.200 | | | | |
| 4 | Lens 2 | −2.653350 (ASP) | 0.250 | Plastic | 1.634 | 23.8 | −3.28 |
| 5 | | 9.907300 (ASP) | 0.206 | | | | |
| 6 | Lens 3 | −2.416050 (ASP) | 0.564 | Plastic | 1.544 | 55.9 | 0.89 |
| 7 | | −0.436310 (ASP) | 0.052 | | | | |
| 8 | Lens 4 | −99.999800 (ASP) | 0.315 | Plastic | 1.544 | 55.9 | −0.91 |
| 9 | | 0.500800 (ASP) | 0.300 | | | | |
| 10 | IR-filter | Plano | 0.300 | Glass | 1.516 | 64.1 | — |
| 11 | | Plano | 0.401 | | | | |
| 12 | Image | Plano | — | | | | |

Note:
Reference wavelength (d-line) is 587.6 nm.

TABLE 14

Aspheric Coefficients

| Surface # | 2 | 3 | 4 | 5 |
|---|---|---|---|---|
| k = | −3.93417E−01 | −4.09287E+00 | −5.30108E+00 | −1.00000E+00 |
| A4 = | −2.82160E−02 | −2.96863E−01 | −4.03215E−01 | 1.23939E−01 |
| A6 = | −7.04027E−01 | −1.31761E+00 | −2.39171E+00 | −7.08558E−01 |
| A8 = | 3.82180E+00 | 1.46662E+00 | 2.65407E+00 | −1.06139E+00 |
| A10 = | −1.49109E+01 | −5.02991E+00 | 4.92089E+00 | 5.68839E+00 |
| A12 = | −2.51566E+00 | −3.54547E−01 | −1.36228E+00 | −3.78851E+00 |
| A14 = | −3.04066E−02 | −8.49596E+00 | — | — |
| A16 = | — | — | — | — |

| Surface # | 6 | 7 | 8 | 9 |
|---|---|---|---|---|
| k = | 2.48276E+00 | −3.35855E+00 | −1.00000E+00 | −6.56596E+00 |
| A4 = | 1.37479E−01 | −6.25589E−01 | −1.59791E−01 | −3.10577E−01 |
| A6 = | 4.13538E−01 | 1.27189E+00 | −5.70436E−02 | 3.29111E−01 |
| A8 = | 2.09736E+00 | −9.89974E−01 | 2.99312E−01 | −3.26627E−01 |
| A10 = | −1.37248E+01 | 7.83736E−01 | −1.58391E−01 | 2.24707E−01 |
| A12 = | 2.60175E+01 | 1.45599E+00 | −7.15635E−03 | −9.41510E−02 |
| A14 = | −1.56660E+01 | −1.27200E+00 | 2.22177E−02 | 1.99520E−02 |
| A16 = | −1.46605E+00 | −7.22381E−01 | −3.58926E−03 | −1.27940E−03 |

In the image capturing lens assembly according to the seventh embodiment, the definitions of f, Fno, HFOV, FOV, V1, V2, R1, R2, R4, R7, R8, T12, CT1, ΣCT, Td, f2, f3, f4, TTL and ImgH are the same as those stated in the first embodiment with corresponding values for the seventh embodiment. Moreover, these parameters can be calculated from Table 13 as the following values and satisfy the following relationships:

| | |
|---|---|
| f (mm) | 2.18 |
| Fno | 2.46 |
| HFOV (deg.) | 36.6 |
| FOV (deg.) | 73.2 |
| V1 − V2 | 32.1 |
| T12/f | 0.09 |
| CT1/T12 | 1.98 |
| ΣCT/Td | 0.77 |
| R4/f | 4.54 |
| (R1 + R2)/(R1 − R2) | −0.82 |
| (R7 + R8)/(R7 − R8) | 0.99 |
| f/f2 | −0.67 |
| f/f3 | 2.45 |
| f/f4 | −2.39 |
| TTL/ImgH | 1.79 |

Figure 15:
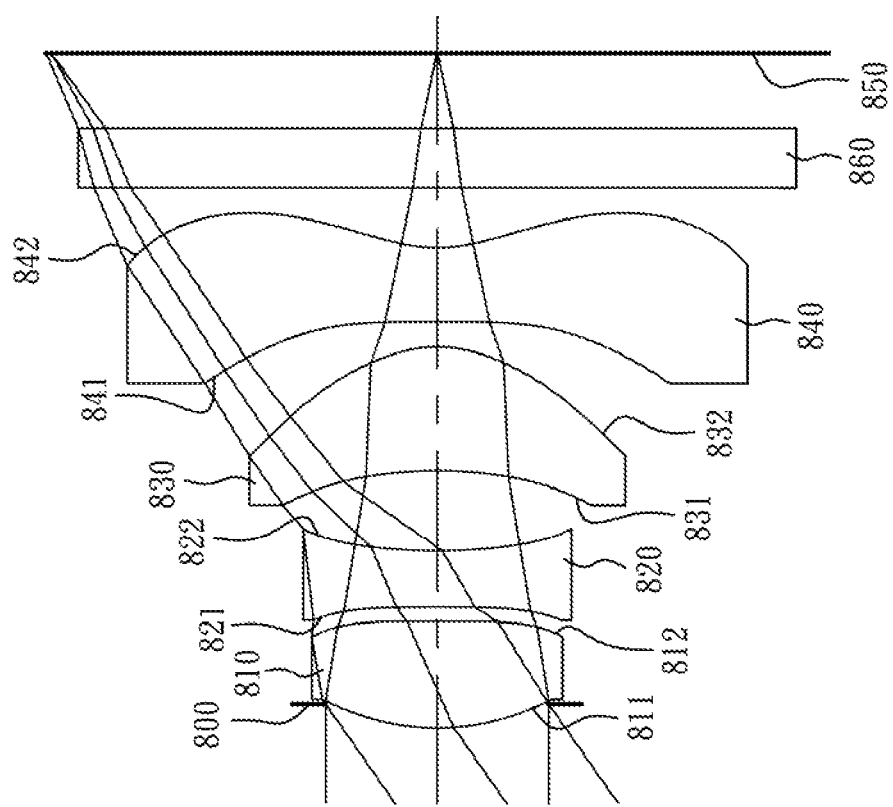
FIG. 15 is a schematic view of an optical image capturing assembly according to the eighth embodiment of the present disclosure.
Figure 16:
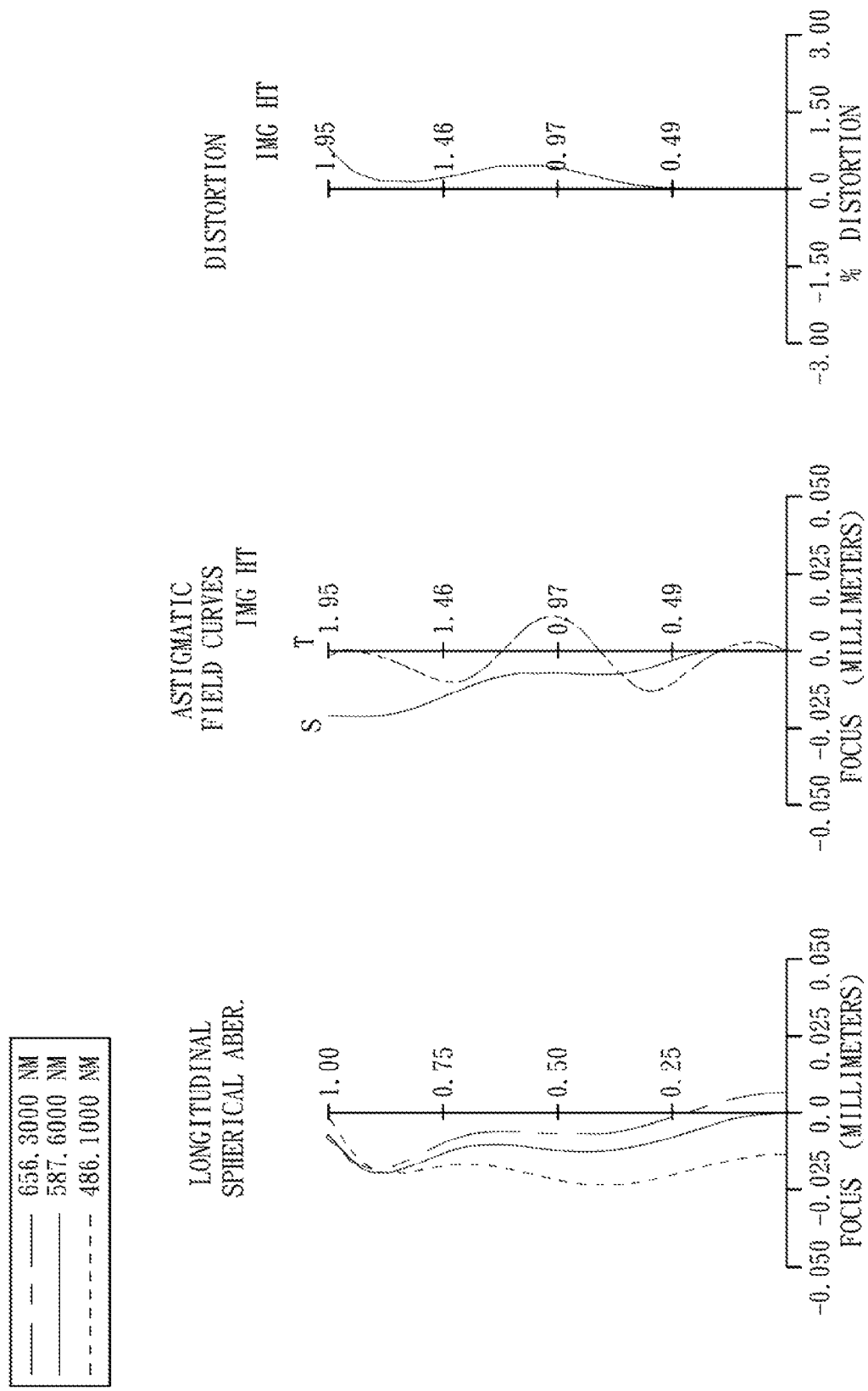
FIG. 16 shows spherical aberration curves, astigmatic field curves and a distortion curve of the optical image capturing assembly according to the eighth embodiment.

FIG. 15 is a schematic view of an optical image capturing assembly according to the eighth embodiment of the present disclosure. FIG. 16 shows spherical aberration curves, astigmatic field curves and a distortion curve of the optical image capturing assembly according to the eighth embodiment. In FIG. 15, the optical image capturing assembly includes, in order from an object side to an image side, an aperture stop 800, the first lens element 810, the second lens element 820, the third lens element 830, the fourth lens element 840, an IR (infrared) cut filter 860 and an image plane 850.

The first lens element 810 is made of plastic material. The first lens element 810 with positive refractive power has a convex object-side surface 811 and a convex image-side surface 812. The object-side surface 811 and the image-side surface 812 of the first lens element 810 are aspheric.

The second lens element 820 is made of plastic material. The second lens element 820 with negative refractive power has a concave object-side surface 821 and a concave image-side surface 822. The object-side surface 821 and the image-side surface 822 of the second lens element 820 are aspheric.

The third lens element 830 is made of plastic material. The third lens element 830 with positive refractive power has a concave object-side surface 831 and a convex image-side surface 832. The object-side surface 831 and the image-side surface 832 of the third lens element 830 are aspheric.

The fourth lens element 840 is made of plastic material. The fourth lens element 840 with negative refractive power has a concave object-side surface 841 and a concave image-side surface 842. The object-side surface 841 and the image-side surface 842 of the fourth lens element 840 are aspheric. Furthermore, the fourth lens element 840 has inflection points formed on the object-side surface 841 and the image-side surface 842 thereof.

The IR cut filter 860 is made of glass and located between the fourth lens element 840 and the image plane 850, and will not affect the focal length of the optical image capturing assembly.

The equation of the aspheric surface profiles of the above lens elements of the eighth embodiment is the same as that of the first embodiment, and will not be stated herein again.

The detailed optical data of the eighth embodiment are shown in Table 15 and the aspheric surface data are shown in Table 16 below.

TABLE 15

8th Embodiment
f = 2.76 mm, Fno = 2.45, HFOV = 35.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.120 | | | | |
| 2 | Lens 1 | 1.189930 (ASP) | 0.541 | Plastic | 1.544 | 55.9 | 2.10 |
| 3 | | −23.436100 (ASP) | 0.071 | | | | |
| 4 | Lens 2 | −14.860300 (ASP) | 0.285 | Plastic | 1.634 | 23.8 | −4.16 |
| 5 | | 3.226200 (ASP) | 0.403 | | | | |
| 6 | Lens 3 | −2.110240 (ASP) | 0.627 | Plastic | 1.544 | 55.9 | 1.46 |
| 7 | | −0.638680 (ASP) | 0.125 | | | | |
| 8 | Lens 4 | −95.056600 (ASP) | 0.378 | Plastic | 1.544 | 55.9 | −1.31 |
| 9 | | 0.718280 (ASP) | 0.300 | | | | |
| 10 | IR-filter | Plano | 0.300 | Glass | 1.516 | 64.1 | — |
| 11 | | Plano | 0.383 | | | | |
| 12 | Image | Plano | — | | | | |

Note:
Reference wavelength (d-line) is 587.6 nm.

TABLE 16

Aspheric Coefficients

| Surface # | 2 | 3 | 4 | 5 |
|---|---|---|---|---|
| k = | 1.04164E−01 | −3.40924E+00 | −9.04052E+00 | −1.00000E+00 |
| A4 = | 1.03129E−03 | −2.37617E−01 | −1.83454E−01 | 1.96165E−01 |
| A6 = | −2.78030E−01 | −1.68202E−01 | −4.07206E−01 | −4.11771E−01 |
| A8 = | 7.26885E−01 | −2.29750E+00 | −1.60271E+00 | 8.90982E−01 |
| A10 = | −7.32175E−01 | 5.19435E+00 | 7.08181E+00 | 9.67101E−02 |
| A12 = | −2.42033E+00 | −7.67649E−01 | −7.70180E+00 | −3.43454E−01 |

TABLE 16-continued

| Aspheric Coefficients | | | | |
|---|---|---|---|---|
| A14 = | −2.07534E−01 | −8.55957E+00 | | |

| Surface # | 6 | 7 | 8 | 9 |
|---|---|---|---|---|
| k = | −1.36384E+00 | −4.01256E+00 | −1.00000E+00 | −6.74569E+00 |
| A4 = | 1.97473E−01 | −4.23173E−01 | −3.20864E−01 | −2.48962E−01 |
| A6 = | −1.82217E+00 | 4.44888E−01 | 3.45980E−02 | 2.07473E−01 |
| A8 = | 6.68363E+00 | −5.38065E−01 | 1.86685E−01 | −1.59797E−01 |
| A10 = | −1.58037E+01 | 7.49149E−02 | −9.17993E−02 | 8.86470E−02 |
| A12 = | 2.06755E+01 | 7.20128E−01 | −1.64712E−02 | −3.27987E−02 |
| A14 = | −1.24862E+01 | −6.48031E−01 | 1.43374E−02 | 6.98729E−03 |
| A16 = | 2.46138E+00 | 1.77124E−01 | −1.75189E−03 | −6.64749E−04 |

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An optical image capturing assembly comprising, in order from an object side to an image side:
   a first lens element with positive refractive power having a convex object-side surface;
   a second lens element with negative refractive power having a concave object-side surface and a convex image-side surface;
   a third lens element with positive refractive power which is made of plastic material and has a convex object-side surface and a convex image-side surface, wherein the object-side surface and the image-side surface of the third lens element are aspheric; and
   a fourth lens element with negative refractive power which is made of plastic material and has a convex object-side surface and a concave image-side surface, wherein the object-side surface and the image-side surface of the fourth lens element are aspheric, and the fourth lens element has at least one inflection point formed on at least one of the object-side surface and the image-side surface thereof;
   wherein a focal length of the optical image capturing assembly is f, a focal length of the fourth lens element is f4, a curvature radius of the image-side surface of the second lens element is R4, and the following relationships are satisfied:

$-2.5 < f/f4 < -0.6$; and $-5.0 < R4/f < -0.2$.

2. The optical image capturing assembly of claim 1, wherein a curvature radius of the object-side surface of the fourth lens element is R7, a curvature radius of the image-side surface of the fourth lens element is R8, and the following relationship is satisfied:

$1.0 < (R7+R8)/(R7-R8) < 6.0$.

3. The optical image capturing assembly of claim 2, wherein a curvature radius of the object-side surface of the first lens element is R1, a curvature radius of the image-side surface of the first lens element is R2, and the following to relationship is satisfied:

$-2.0 < (R1+R2)/(R1-R2) < 0.0$.

4. The optical image capturing assembly of claim 3, further comprising:
   a stop, located between an object and the second lens element.

5. The optical image capturing assembly of claim 4, wherein the Abbe number of the first lens element is V1, the Abbe number of the second lens element is V2, and the following relationship is satisfied:

$28 < V1-V2 < 42$.

6. The optical image capturing assembly of claim 4, wherein an axial distance between the first lens element and the second lens element is T12, the focal length of the optical image capturing assembly is f, and the following relationship is satisfied:

$0.13 < T12/f < 0.27$.

7. The optical image capturing assembly of claim 4, wherein the focal length of the optical image capturing assembly is f, a focal length of the second lens element is f2, and the following relationship is satisfied:

$-1.4 < f/f2 < -0.6$.

8. The optical image capturing assembly of claim 5, wherein a central thickness of the first lens element is CT1, the axial distance between the first lens element and the second lens element is T12, and the following relationship is satisfied:

$0.2 < CT1/T12 < 1.3$.

9. The optical image capturing assembly of claim 5, wherein a sum of the central thickness from the first lens element to the fourth lens element is ΣCT, an axial distance between the object-side surface of the first lens element and the image-side surface of the fourth lens element is Td, and the following relationship is satisfied:

$0.5 < \Sigma CT/Td < 0.81$.

10. The optical image capturing assembly of claim 2, wherein both of the second lens element and the third lens element have at least one inflection point formed on at least one of the object-side surface and the image-side surface thereof.

11. The optical image capturing assembly of claim 2, wherein a maximal field of view of the optical image capturing assembly is FOV, and the following relationship is satisfied:

$72 \text{ degrees} \leq FOV < 100 \text{ degrees}$.

12. The optical image capturing assembly of claim 3, wherein the curvature radius of the image-side surface of the second lens element is R4, the focal length of the optical image capturing assembly is f, and the following relationship is satisfied:

$-1.8 < R4/f < -0.2$.

13. The optical image capturing assembly of claim 3, wherein the focal length of the optical image capturing assembly is f, a focal length of the third lens element is f3, and the following relationship is satisfied:

$1.2 < f/f3 < 1.83$.

14. The optical image capturing assembly of claim 2, wherein a maximum image height of the optical image capturing assembly is ImgH, an axial distance between the object-side surface of the first lens element and the image plane is TTL, and the following relationship is satisfied:

$TTL/ImgH < 1.95$.

* * * * *